US012285856B2

(12) United States Patent
Yu et al.

(10) Patent No.: US 12,285,856 B2
(45) Date of Patent: Apr. 29, 2025

(54) END EFFECTOR TOOL CHANGER FOR ROBOTIC SYSTEMS

(71) Applicant: XYZ Robotics Inc., Natick, MA (US)

(72) Inventors: Kuan-Ting Yu, Natick, MA (US); Aaron Hwang, Bedford, MA (US)

(73) Assignee: XYZ Robotics Global Inc., Grand Cayman (KY)

( * ) Notice: Subject to any disclaimer, the term of this patent is extended or adjusted under 35 U.S.C. 154(b) by 15 days.

(21) Appl. No.: 18/895,397

(22) Filed: Sep. 25, 2024

(65) Prior Publication Data

US 2025/0010492 A1  Jan. 9, 2025

Related U.S. Application Data

(63) Continuation of application No. PCT/US2022/024915, filed on Apr. 14, 2022.

(51) Int. Cl.
*B25J 15/04* (2006.01)
*B25J 15/00* (2006.01)

(52) U.S. Cl.
CPC ....... *B25J 15/0052* (2013.01); *B25J 15/0408* (2013.01)

(58) Field of Classification Search
CPC ........ B23P 19/10; B23P 19/102; B23Q 3/155; B23Q 3/15503; B23Q 3/15552; B23Q 7/04; B23Q 7/046; B25J 15/04; B25J 15/0408; B25J 15/0491
USPC ......... 414/749.1–749.6, 751.1, 752.2, 753.1; 483/901; 901/31, 40, 41
See application file for complete search history.

(56) References Cited

U.S. PATENT DOCUMENTS

| | | | |
|---|---|---|---|
| 4,995,493 | A | 2/1991 | Cotsman et al. |
| 5,954,446 | A | 9/1999 | Ireland |
| 9,272,423 | B2 | 3/2016 | Gordon et al. |
| 10,414,055 | B2 | 9/2019 | Kerestes et al. |
| 11,130,243 | B2 | 9/2021 | Son |

FOREIGN PATENT DOCUMENTS

WO  2021081388 A  4/2021

OTHER PUBLICATIONS

XYZ Robotic Inc., "XYZ Robotics Tool Changing System", https://www.youtube.com/watch?v=Hr6pMekfOeM, published on Sep. 17, 2020.

(Continued)

*Primary Examiner* — Ronald P Jarrett
(74) *Attorney, Agent, or Firm* — American Patent Agency PC; Daniar Hussain; Stephen M. Hou

(57) ABSTRACT

End effector tool changers for a robotic system are disclosed. The end effector tool changer is physically compact, mechanically robust, has high radial strength, prevents undesirable rotations, uses minimal sensory input, is suitable for a wide variety of tools, and operates quickly. The end effector tool changer includes a robotic arm attachment portion, including a first magnetic part and a first engagement part, and a tool attachment portion, including a second magnetic part and a second engagement part, where the first engagement part is configured to engage with the second engagement part, the first engagement part and the second engagement part are selected from the group consisting of a pin and a socket, and the first magnetic part spatially and magnetically corresponds to the second magnetic part.

16 Claims, 33 Drawing Sheets

(56) References Cited

OTHER PUBLICATIONS

"Notification of Transmittal of the International Search Report and the Written Opinion of the International Searching Authority," PCT/US22/24915, XYZ Robotics Inc. as the Applicant, mailed on Jul. 25, 2022.

END EFFECTOR TOOL CHANGER FOR ROBOTIC SYSTEMS

FIELD OF THE INVENTION

Embodiments of the present invention are in the field of robotic systems that use artificial intelligence, computer vision, and/or mechanical systems to manipulate (e.g., pick, sort, and place) objects, and pertain particularly to tool changers for robotic systems.

BACKGROUND OF THE INVENTION

The statements in the background of the invention are provided to assist with understanding the invention and its applications and uses, and may not constitute prior art.

There are several approaches that have been used to change end effector tools for robotic systems to pick objects of varying dimensions, weights, materials, and levels of fragility. However, many of these approaches either require human intervention, are too slow, do not retain the new tool firmly, or are unreliable. For example, some conventional tool changers have two or more magnets that are magnetized and are axially symmetric. Such a tool changer has a low radial strength, and the tool portion can become unintentionally disconnected from the robotic arm portion with even a minor transverse force. Such a tool changer can also easily rotate, even when such rotation is undesired, and there is no control over the axial rotation.

Therefore, it would be an advancement in the state of the art to provide an end effector tool changer for various robotic systems (e.g., pick, sort, and place robotic systems) that is physically compact, mechanically robust, has high radial strength, prevents undesirable rotations, uses minimal sensory input, is suitable for a wide variety of tools, and operates quickly.

It is against this background that the present invention was developed.

BRIEF SUMMARY OF THE INVENTION

The present invention relates to an end effector tool changer for various robotic systems, such as pick, sort, and place robotic systems.

More specifically, in various embodiments, the present invention is an end effector tool changer device for a robotic system, including a robotic arm attachment portion, including a first magnetic part and a first engagement part; and a tool attachment portion, including a second magnetic part and a second engagement part; where the first engagement part is configured to engage with the second engagement part; where the first engagement part and the second engagement part are selected from the group consisting of a pin and a socket; and where the first magnetic part spatially and magnetically corresponds to the second magnetic part.

In some embodiments, the first magnetic part is an upper magnet slipped into a cavity of the first engagement part, and the second magnetic part is a lower magnet slipped into a cavity of the second engagement part.

In some embodiments, the first engagement part and the second engagement part are keyed in cross-sectional shape.

In some embodiments, the first engagement part and the second engagement part are non-circular in cross-sectional shape.

In some embodiments, the first engagement part and the second engagement part are hexagonal in cross-sectional shape.

In some embodiments, the tool attachment portion further includes a plurality of rack grooves.

In some embodiments, one or more of the plurality of rack grooves are beveled.

In some embodiments, the plurality of rack grooves is a pair of rack grooves.

In some embodiments, the end effector tool changer device further includes a tool plate including a slot, where the dimensions of the slot correspond to the plurality of rack grooves.

In some embodiments, the slot is tapered.

In some embodiments, the robotic arm attachment portion further includes a robotic arm attachment portion through-hole and the tool attachment portion further includes a tool attachment portion through-hole.

In some embodiments, the robotic arm attachment portion through-hole and the tool attachment portion through-hole are configured to carry electrical power or electrical signals.

In some embodiments, the robotic arm attachment portion through-hole and the tool attachment portion through-hole include a plurality of air channels, where each of the plurality of air channels is configured to maintain a vacuum or to carry compressed air.

In some embodiments, the robotic arm attachment portion through-hole is adjacent to a leakage prevention device.

In some embodiments, the first engagement part includes a pin with a tapered tip.

In some embodiments, the second engagement part includes a beveled socket.

In some embodiments, the robotic system is a robotic system configured for object manipulation.

Other aspects and embodiments of the present invention include the methods and processes comprising the steps described herein, and also include the processes and modes of operation of the systems and devices described herein. Yet other aspects and embodiments of the present invention will become apparent from the detailed description of the invention when read in conjunction with the attached drawings.

BRIEF DESCRIPTION OF THE DRAWINGS

Embodiments of the present invention described herein are exemplary, and not restrictive. Embodiments will now be described, by way of examples, with reference to the accompanying drawings, in which.

DETAILED DESCRIPTION OF THE INVENTION

Overview

With reference to the figures provided, embodiments of the present invention are now described in detail. In the following description, for purposes of explanation, numerous specific details are set forth in order to provide a thorough understanding of the invention. It will be apparent, however, to one skilled in the art that the invention can be practiced without these specific details. In other instances, structures, devices, activities, and methods are shown using schematics, use cases, and/or flow diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality, and without imposing limitations upon, the invention.

There are several approaches that have been used to change end effector tools for a sort and place robotic system to pick objects of varying dimensions, weights, materials, and levels of fragility. However, many of these approaches either require human intervention, are too slow, do not retain the new tool firmly, or are unreliable. For example, some conventional tool changers have two or more magnets that are magnetized and are axially symmetric. Such a tool changer has a low radial strength, and the tool changer can become unintentionally disconnected from the robotic arm with even a minor transverse force. Such a tool changer can also easily rotate, even when such rotation is undesired, and there is no control over the axial rotation.

Therefore, it would be an advancement in the state of the art to provide an end effector tool changer for a robotic system that is mechanically robust, has high radial strength, prevents undesirable rotations, uses minimal sensory input, is suitable for a wide variety of tools, and operates quickly.

Context of the End Effector Tool Changer within a Robotic System

Figure 1A:
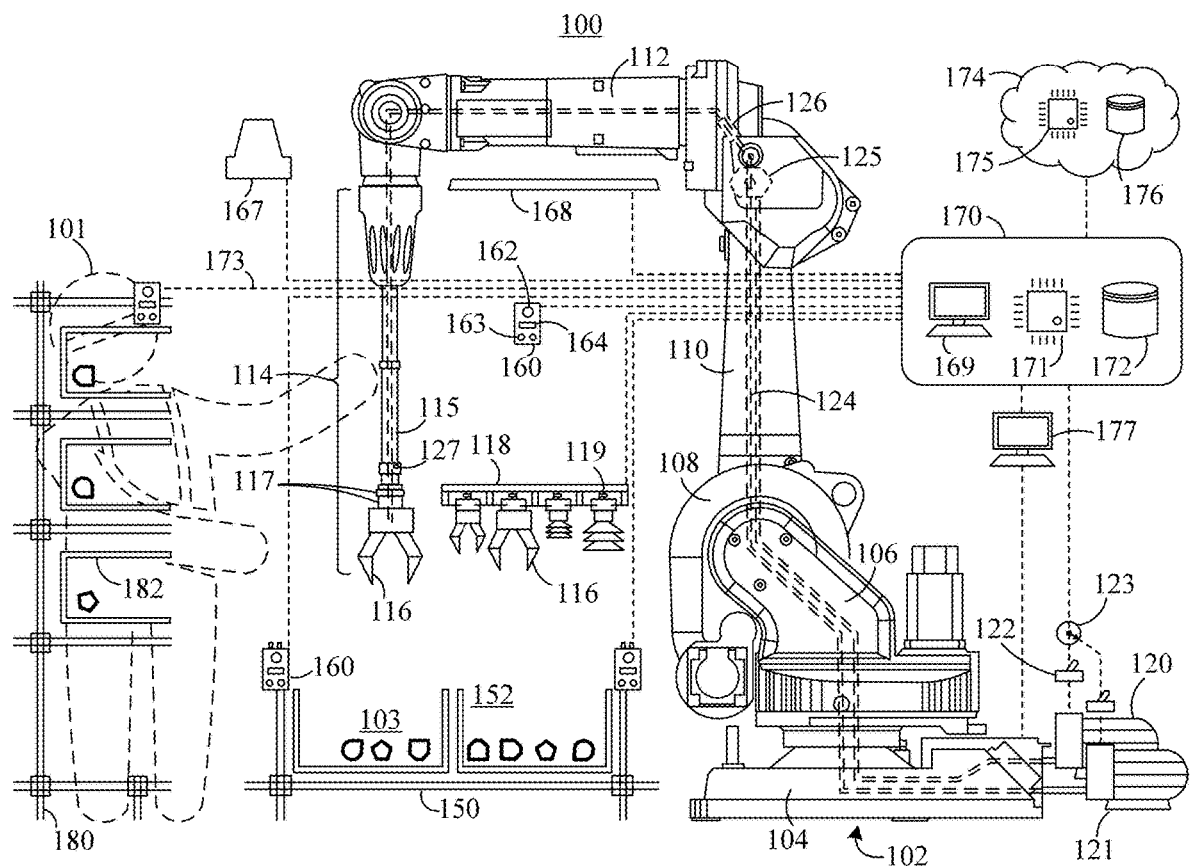
FIGS. 1A, 1B, and 1C show exemplary robotic systems in accordance with some embodiments.
Figure 1B:
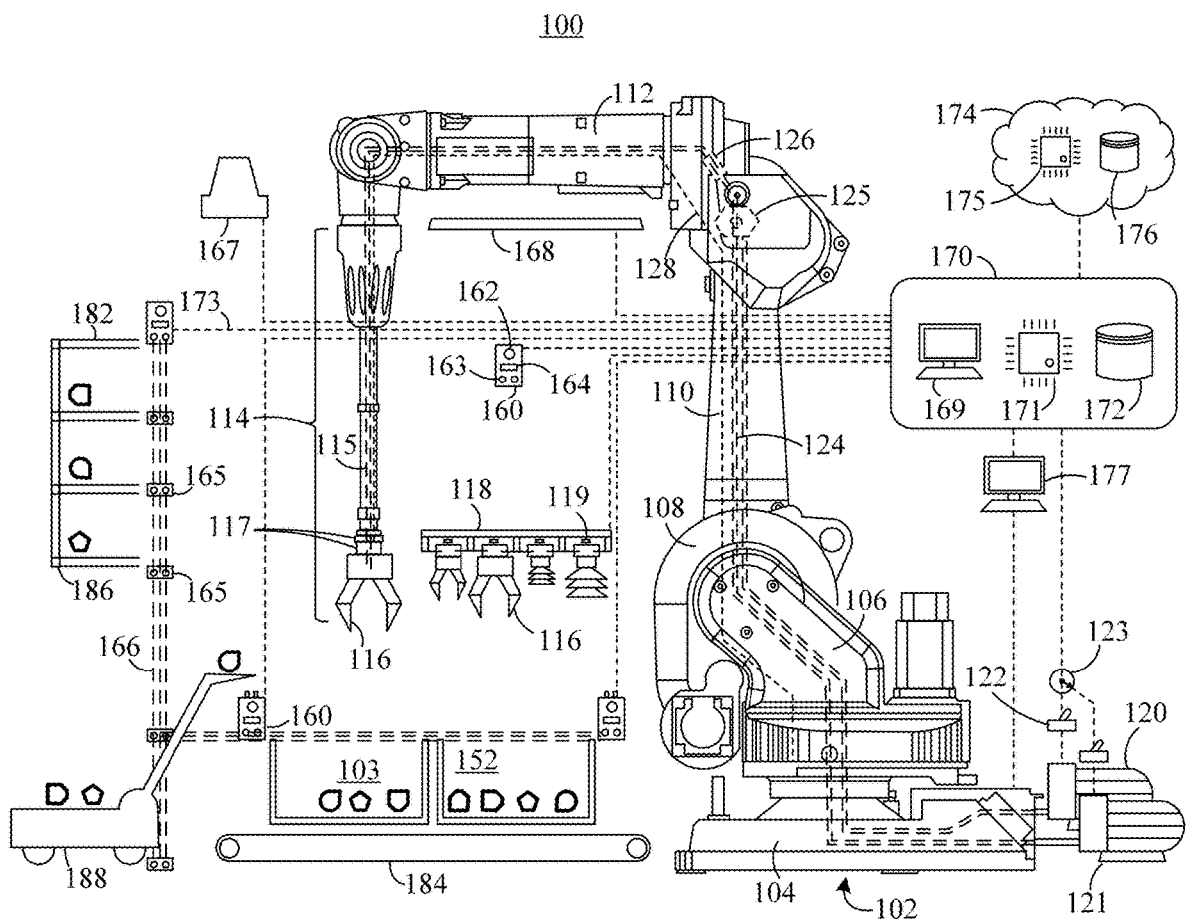
Figure 1C:
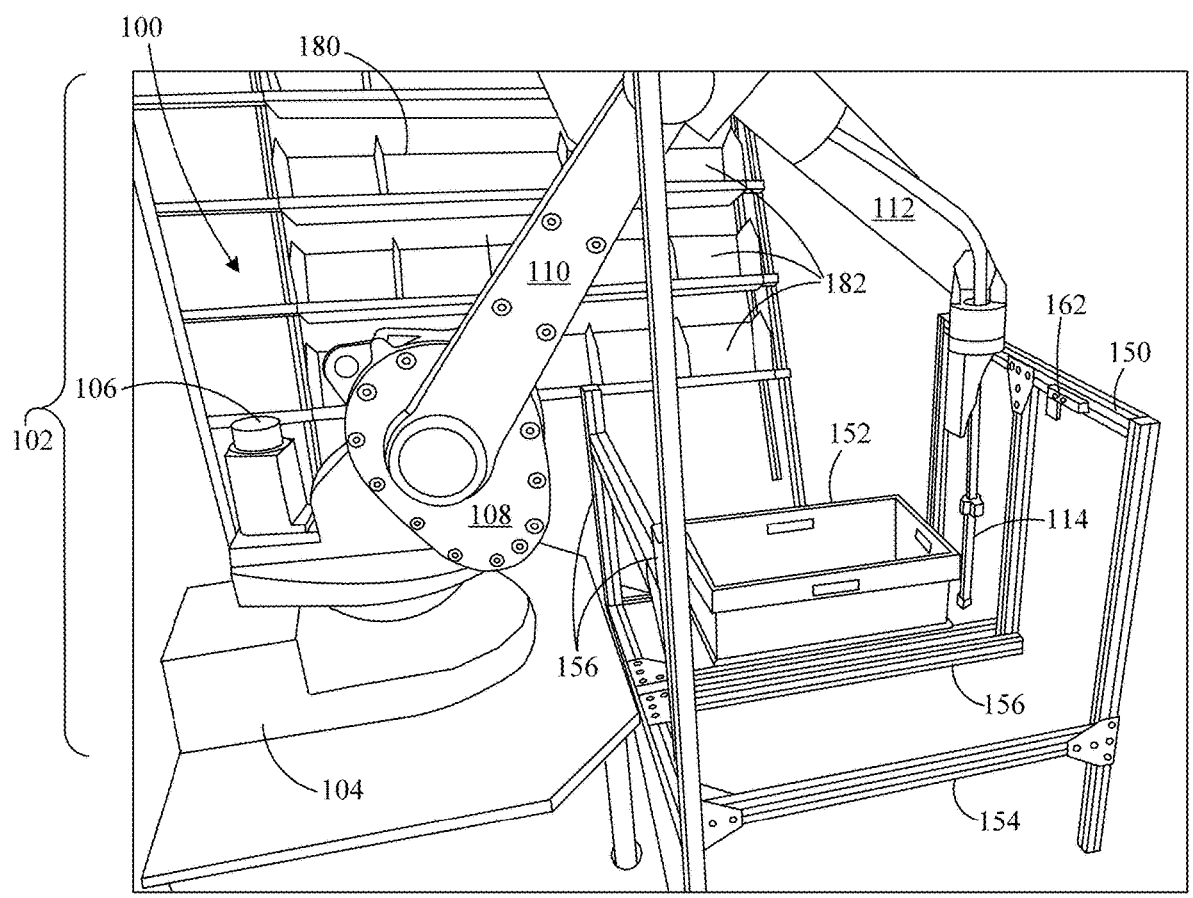

FIGS. 1A, 1B, and 1C show an exemplary robotic system 100 according to some embodiments of the present technology. The robotic system 100 is configured to manipulate a wide variety of objects 103 including novel objects that the system has not previously picked, placed, or even identified. In some embodiments, the robotic system is a pick, sort, and place robotic system.

In some embodiments, robotic system 100 includes an end effector, which further includes a tool that manipulates objects. In some embodiments, the end effector and the tool remain stationary relative to the robotic system while an object's position is controlled. For example, the robotic system may alter the slope or other characteristics of the surface on which the object is sitting to slide it into a stationary tool, such as a gripper or a suction.

In other embodiments, the end effector and the tool are attached to a motion device, such as a moveable robotic arm 102. The tool may include, for example, a knife that may slice or poke an object, a key that may open a lock, or a center punch that may mark a plate. In some embodiments, the tool is useful in a pick, sort, and place robotic system. Such tools may include grippers and suctions. Although the description below discloses tools and related systems for pick, sort, and place robotic systems, embodiments useful for other types of tools are readily apparent to those skilled in the art.

Pick, sort, and place robotic system 100 includes a robotic arm 102, various input and output components and structures such as a sorting stand 150 and a receptacle stand 180. An operator 101 may supervise or assist the robotic arm (see FIG. 1A). In some cases, the sorting stand 150 and/or receptacle stand 180 are replaced by or include a conveyor 184, a put wall 186, and/or an automated guided vehicle (AGV) 188, as shown in FIG. 1B. The robotic arm 102 identifies objects 103 from tote 152 in sorting stand 150, picks the objects, and places the gripped objects at locations in receptacle stand 180 (e.g., bins 182). As shown in FIG. 1C, sorting stand 150 may include support structure 154, which is a system of metal support members bolted together. The side of support structure 154 opposite to robotic arm 102 may include an opening allowing a tote (e.g., tote 152) or other receptacle to be inserted into sorting stand 150. Sorting stand 150 optionally includes base 156 for supporting receptacles.

Pick, sort, and place robotic system 100 also includes a control system 170 to monitor and manage robot motion. The control system provides instructions and/or command signals for moving (e.g., rotating, extending, retracting) the various components of robotic arm 102. The control system 170 includes a processor 171, memory 172 (e.g., a non-transitory computer-readable storage medium), data links 173, communications interfaces, and other components. The control system may also include an optional cloud component 174 with processors 175 and databases 176 accessible over a local or remote network (e.g., Internet).

Pick, sort, and place robotic system 100 also includes a vision system with a vision processor 169, sensor devices 160, and other components. Each sensor device 160 may have one or more cameras 162, a variety of sensors 163 (e.g., image, depth, visible light, and/or infrared sensors), barcode readers 164, or other components. In some cases, cameras 162 capture image data that includes visible light data (e.g., RGB data) and/or depth information (e.g., how far objects in the image are from the camera). The captured image data is sent to the control system for processing. The vision system can have any number of sensors and cameras. Its components can be supported by any robotic, input/output component or structure, and be located in other locations.

Pick, sort, and place robotic system 100 also includes a motion controller 177. The vision processor 169 and motion controller 177 may be external or located within the control system 170. FIGS. 1A and 1B, for example, show an external motion controller 177 and a vision processor 169 that is located within the control system.

Pick, sort, and place robotic system 100 may also include a light curtain system that includes multiple sensors 165 generating a light curtain 166. Pick, sort, and place robotic system 100 may also include a LIDAR 167. The light curtain system and the LIDAR may be used either for safety purposes (e.g., monitor human movement around the robotic system) or for operations (e.g., detect the movement of objects or system components). Pick, sort, and place robotic system 100 may also include lighting devices 168 that can be dimmed depending on tote color or other environmental and operational factors.

Robotic arm 102 includes base 104 for mounting to a support surface (e.g., the floor or some other support structure). Frame 106 is rotatably connected to base 104. Lower arm 108 is rotatably connected to frame 110. Upper arm 112 is rotatably connected to lower arm 108. End effector 114 is rotatably connected to upper arm 112. End effector 114 includes one or more tools 116 as well as a tube 115. The end effector 114 and each tool 116 have tool changer 117 parts allowing various tools to be compatible with the end effector 114. A tool rack 118 is used for storing and accessing the various tools. Each tool slot on the tool rack 118 has a tool sensor 119 to indicate the presence or absence of a tool. FIGS. 1A and 1B show multiple gripping and suction tools such as fingered grippers and suction tools of various sizes. In the case of FIG. 1, gripper 116 is a pneumatic gripper. Other grippers, such as gripping fingers or other types of suction grippers can also be used. In some cases, end effector 114 is compliant and/or multi-purpose.

Pick, sort, and place robotic system 100 may also include a vacuum source 120 (e.g., pump) or compressed air source 121 to provide the pressure necessary to use the tools, where vacuum denotes negative pressure and compressed air denotes positive pressure. Each source is controlled by a source switch 122 operable by the control system. A source selection switch 123 allows the control system to select the adequate source to operate the tool that is currently in use. A hose 124 runs through the robotic arm from the end effector to the source. A valve 125 allows the control system to select a pressure source, or to connect the hose to the atmosphere (i.e., no positive or negative pressure applied). A pressure sensor 126 allows the control system to monitor the pressure level within the hose. A component of a tool changer 127 permits efficient and reliable tool-changing. A weight sensor 131 located on the end effector allows the control system to monitor the weight of the tool and its load (see FIG. 1A). In some embodiments, a tool wire 128 running from the end effector to the base or to the frame of the robotic arm allows the control system to determine whether a tool is attached to the end effector.

All components of the control system 170 and vision system (e.g., cameras and sensors), are connected through data links 173. Furthermore, all components of the robotic system involved in motion or monitoring (e.g., motion controller 177, pump/selection switches 122/123, valve 125, pressure sensor 126, tool sensors 119, lighting devices 168) have data links 173 to the control system 170.

When the robotic system picks up a load using an end effector 114 attached with a load cell, the load cell detects the load's weight, by acting as a transducer that converts the gravitational force of the load, i.e., its weight, applied onto the load cell into an electrical output that the robotic system collects. However, most commercially available load cells are designed to handle and measure force in one dimension only. When the load cell is subjected to forces in other directions, the resulting torsion or bending may damage the load cell and distort the weight measurement.

When the robotic system identifies a load to be picked up, it may also determine a particular end effector tool among a selection of tools that is most appropriate for picking the load. However, in some cases, the robotic system may need to frequently change tools between objects. In such cases, there is a great need for a tool changer that operates automatically without human intervention. Current solutions include end effectors with magnetically coupled components that attach and detach seamlessly. However, some such devices are axially magnetized and have low radial strength. They may also rotate easily, making the system difficult to use and control. Moreover, magnetic couplings may not be sufficiently robust: tools may fall off due to collision or sudden movements. A new solution is to add mechanical pins to the magnetically coupled components in order to maintain the orientation of the two components and to add radial strength. The end effector tool changer described in this disclosure includes a system designed for such a purpose.

Interaction Between System Components of a Robotic System

In some embodiments, the pick and place robotic system includes a robotic arm with an end effector configured to have an attached tool at its distal end; a tool changing device; a tool rack; a vision system; and a control system. The tool changing device further includes a robotic arm attachment portion and a tool attachment portion. The tool rack includes one or more tool plates and a plurality of tools. The control system includes a processor, a non-transitory computer-readable storage medium, and a plurality of communication interfaces.

In some embodiments, at least one tool includes a tool attachment portion of the tool changing device at its proximal end. The robotic arm attachment portion is configured to attach to the tool attachment portion, and at least one tool plate of the one or more tool plates includes a tool slot.

In some embodiments, each tool plate has exactly one tool slot. In other embodiments, a tool plate may have more than one tool slot. In one embodiment, the tool rack further includes one or more sensors associated with a tool slot, where the one or more sensors are configured to indicate the presence of a tool in the tool slot.

In one embodiment, the control system receives data from each of the sensors on the tool rack and can determine, at any time, whether a given tool is located at its slot in the tool rack.

In yet another embodiment, the tool attachment portion further includes a plurality of grooves, and the plurality of grooves spatially corresponds to a tool slot on a tool plate.

The grooves enable tools to slide into the tool rack and to be retrieved from the tool rack in a robust and timely manner.

In one embodiment, the pick and place robotic system further includes a weight sensor at the distal end of the end effector, where the weight sensor is configured to measure the weight of an attached tool and its load (e.g., one or more objects).

A weight sensor may allow the control system to detect the presence or absence of a tool, the number of objects carried by it.

In one embodiment, the pick and place robotic system further includes an electric circuit, where the electric circuit is configured to indicate the presence of a tool attached to the end effector. In one embodiment, the electric circuit is a tool wire.

A tool wire may be configured to be in contact with a tool when a tool is attached to the end effector so as to convey to the control system whether a tool is attached. In one embodiment, the presence of a tool is determined electrically (e.g., through detecting a change in wire impedance, current intensity, voltage, etc.).

In one embodiment, the tool wire is run from the tool, through the pass-through end effector tube, to a proximal part of the robotic arm such as its base or its frame, where the information is conveyed to the control system through a data link.

In some embodiments, the pick and place robotic system further includes a plurality of input and output components, where at least one output component corresponds to an object type, and where the plurality of input and output components are selected from the group consisting of a sorting stand, a tote, a receptacle stand, a bin, a tote conveyor, an object conveyor, a put wall, an automated guided vehicle (AGV), and a shelf.

Objects may be classified by type. Object types may involve their shape (e.g., round vs. elongated objects), the material they are made of (e.g., plastic vs. metal objects), their color, or their nature (e.g., fruits vs. vegetables, apples vs. oranges). In one embodiment, objects having the same barcode or the same destination (e.g., shipping address, destination department in an office or plant, etc.) belong to the same object type. In one embodiment, objects belonging to the same order (e.g., they have the same order number) belong to the same object type. In one embodiment, each of the various output components (e.g., the bins in a sorting stand) are associated with distinct object types.

In some embodiments, the robotic arm and tool attachment portions further include a through-hole. In some embodiments, the through-hole transmits vacuum or compressed air between an attached tool and its corresponding source pump. In some embodiments, the through-hole includes a mechanical pass-through. In some embodiments, the through-hole includes an electrical pass-through. In further embodiments, the robotic arm and tool attachment portions include a plurality of through-holes, each of which may be any of the aforementioned types.

In one embodiment, the pick and place robotic system further includes a first hose, where the through-hole of the robotic arm attachment portion is connected to a distal end of the first hose.

In one embodiment, the pick and place robotic system further includes a pressure sensor, where the pressure sensor is located on the first hose. Data from the pressure sensor (e.g., a pressure reading) may indicate the presence or absence of an attached tool or a picked object.

In one embodiment, the pick and place robotic system further includes a source pump, where the source pump is connected to the proximal end of the first hose, and the source pump is selected from the group consisting of a vacuum pump and a compressed air pump.

In systems operating using a single source pump, the first hose is the hose 124, represented in FIGS. 1A and 1B, connecting the tool directly to the source pump, where the term "connect" denotes the enabled flow of air, vacuum, or pressure.

In another embodiment, the pick and place robotic system further includes a valve and one or more second hoses, where the valve connects the proximal end of the first hose to one valve output selected from the group consisting of the atmosphere and the one or more second hoses.

In one embodiment, the pick and place robotic system further includes one or more source pumps, where at least one of the one or more second hoses connects a valve output to one of the one or more source pumps, at least one tool of the plurality of tools corresponds to one of the one or more source pumps, and a source pump of the one or more source pumps is selected from the group consisting of a vacuum pump and a compressed air pump.

In systems operating using more than one source pump (e.g., one vacuum pump and one compressed air pump), a valve is required to switch between pumps or to connect the tool to the atmosphere (i.e., disconnect from all pumps). In this case, the first hose is the distal segment of the hose 124 shown in FIGS. 1A and 1B. Furthermore, a second hose is required to connect the valve to each of the source pumps. The second hoses represent the proximal segments of the hose 124 shown in FIGS. 1A and 1B, connecting the valve to each of the source pumps.

In one embodiment, each source pump has a pump switch to activate it, and a pump selection switch is used by the control system to activate the required pump switch through data links or any other form of control signaling (e.g., an electrical ON/OFF signal).

In other embodiments, a fluid pump is used to control a tool. In this case, the through-hole, hoses, pressure sensors, and valve, are configured to operate with a fluid.

In one embodiment, the vision system includes a vision processor, a plurality of vision communication interfaces, and one or more vision components selected from the group consisting of a camera, a barcode reader, a depth sensor, an infrared sensor, a light curtain system, and a LIDAR; and where at least one component of the vision system is connected to the vision processor through a data link, and the vision processor is connected to the control system through a data link In one embodiment, the pick and place robotic system further includes a lighting source, where the lighting source is configured to emit multiple light intensities.

In one embodiment, the control system controls robotic arm movements through a motion controller. In one embodiment, the motion controller also controls the valve.

In one embodiment, data from the pressure sensor, the weight sensor, the tool wire, the vision system sensors, the tool sensors, or any other component with a communication interface, is transmitted at regular time intervals to the control system (i.e., a data push). In another embodiment, such data is transmitted only upon request from the control system (i.e., a data pull).

In one embodiment, the tool wire is configured to provide the control system with information on the presence of an attached tool at the end effector continuously and instantaneously, through an electrical signal.

Components of the End Effector Tool Changer

Figure 2A:
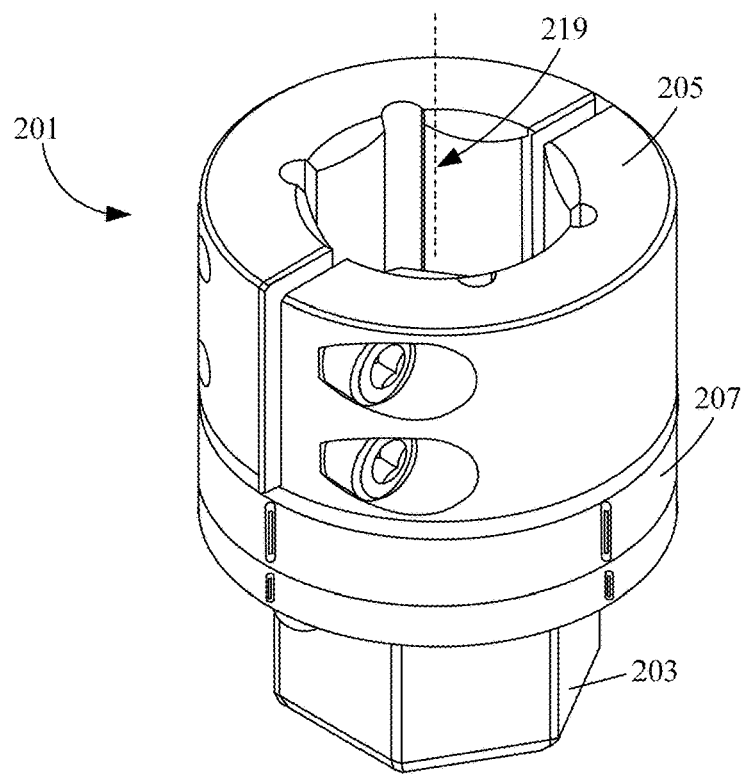
FIG. 2A shows an isometric view of an example arm attachment portion of an end effector tool changer for a robotic system, in accordance with one embodiment of the invention.

FIG. 2A shows an isometric view of an example arm attachment portion 201 of an end effector tool changer 117 for a robotic system 100, in accordance with one embodiment of the invention. The arm attachment portion 201 is attached to the arm 102 of the robotic system 100, and is designed to complement the tool attachment portion 211 of the end effector tool changer 117 described in reference to FIG. 2B where the faces of the two portions come into contact, so that the arm attachment portion 201 and the tool attachment portion 211 are mated or engaged. When the arm attachment portion 201 is attached to the arm 102 of the robotic system 100, the arm attachment portion 201 and the tool attachment portion 211 are mated or engaged, and the tool attachment portion 211 is attached to a tool 116 of the robotic system 100, the tool 116 is said to be loaded onto the arm of the robotic system. Conversely, when the arm attachment portion 201 is attached to the arm 102 of the robotic system 100, the arm attachment portion 201 and the tool attachment portion 211 are not engaged, and the tool attachment portion 211 is attached to a tool 116 of the robotic system 100, the tool 116 is said to be unloaded from the arm 102 of the robotic system 100.

Figure 2B:
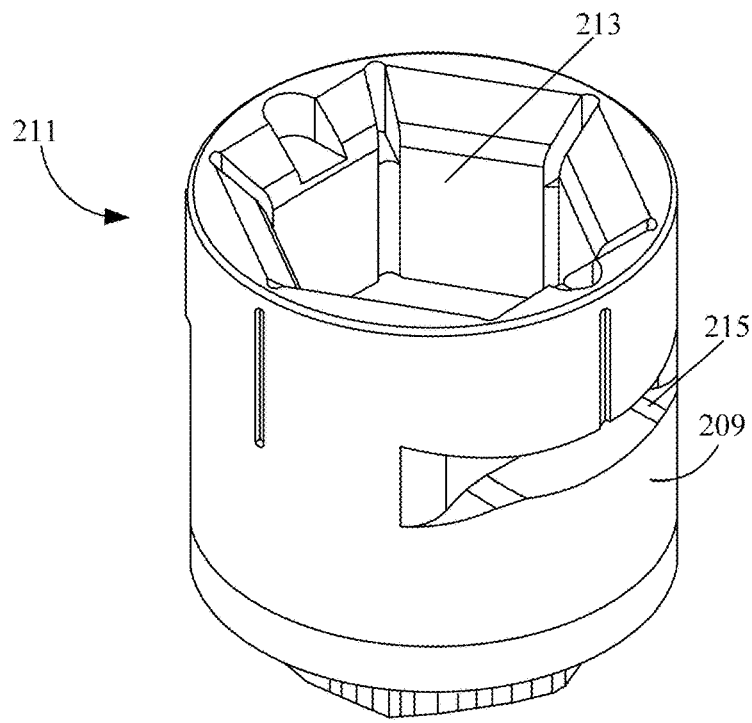
FIG. 2B shows an isometric view of an example tool attachment portion of an end effector tool changer for a robotic system, in accordance with one embodiment of the invention.

The arm attachment portion 201 and the tool attachment portion 211 are mated or engaged through an engagement mechanism, and are held together by a magnetic system. In some embodiments, the magnetic system includes a first magnetic part 341 (shown in FIG. 3D), which is associated with or is part of the arm attachment portion 201, and a second magnetic part 343 (shown in FIG. 3D), which is associated with or is part of the tool attachment portion 211. In some embodiments, the engagement mechanism includes a first engagement part 203, which is associated with or is part of the arm attachment portion 201, and a second engagement part 213, which is associated with or is part of the tool attachment portion 211. In some embodiments, the first engagement part of the engagement mechanism is or includes a pin 203 protruding from the face of the arm attachment portion 201, as shown in FIG. 2A. Similarly, in some embodiments, the second engagement part of the engagement mechanism is or includes a socket 213, as shown in FIG. 2B. This set of embodiments is shown in the drawings, and other components are described with reference to this set of embodiments, but other arrangements of pin and socket are apparent to those skilled in the art. Such arrangements are discussed with reference to FIG. 2B.

In some embodiments, the arm attachment 201 (also called the "upper assembly") includes the first magnetic part 341 of the magnetic system and a main body 207 (also called an "upper main body"), which further includes a pin 203. The first magnetic part 341 of the magnetic system corresponds, spatially and magnetically, with the second magnetic part 343 of the magnetic system, as described in greater detail with reference to FIG. 2B. In some embodiments, the first magnetic part 341 of the magnetic system is a magnet (also called an "upper magnet"). In some embodiments, the upper magnet 341 is a ring magnet. In some embodiments, the pin 203 is spatially centered on the face of the arm attachment portion 201.

The pin 203, when coupled with the tool attachment portion 211 of the end effector tool changer 117 described in reference to FIG. 2B, maintains the orientation of the end effector tool 116 so that the system does not rotate. Furthermore, the pin 203 provides radial strength, adding robustness to the system when it is mechanically disturbed, such as by bumping. To prevent rotation between the arm attachment portion 201 and the tool attachment portion 211 when the pin 203 and the socket 213 are engaged, in some embodiments, the cross-section of the pin 203 is keyed. In some embodiments, the cross-section of the pin 203 is non-circular. In further embodiments, the cross-section of the pin 203 is a polygon. In further embodiments, the polygon is a hexagon.

In some embodiments, the pin 203 and the rest of the upper main body 207 are constructed together as a single piece, such as by molding, machining, or 3D printing. Some advantages of single-piece construction include the ease and speed of mass production and closer consistency within a batch of upper main bodies 207.

The arm attachment portion 201 optionally includes a through-hole 219 to access the various capabilities of a tool 116. In some embodiments, the through-hole 219 is capable of maintaining a vacuum for a vacuum-driven tool 116. In some embodiments, the through-hole 219 is capable of carrying compressed air for a compressed air-driven tool 116. In other embodiments, the through-hole 219 is capable of carrying mechanical or electrical connections between the arm 102 and the tool 116, such as wires carrying electrical power or electrical signals. In some embodiments, the through-hole 219 is the location for electrical contact points, such as spring-loaded pogo pins. In some embodiments, the arm attachment portion 201 includes a plurality of through-holes 219, each of which may be any of the aforementioned types. In some embodiments, the each of the plurality of through-holes 219 corresponds to a separate air channel for controlling a vacuum-driven tool 116 or a compressed air-driven tool 116. In such embodiments, the plurality of through-holes 219 thus corresponds to a plurality of air channels.

FIG. 2B shows an isometric view of an example tool attachment portion 211 of an end effector tool changer 117 for a robotic system 100, in accordance with one embodiment of the invention. The tool attachment portion 211 is attached to a gripper tool 116 of the robotic system, and is designed to complement the arm attachment portion 201 described in reference to FIG. 2A. The tool attachment portion 211 includes the second magnetic part 343 of the magnetic system and a main body 209 (also called a "lower main body"), which further includes a socket 213, and a plurality of rack grooves 215. As mentioned with reference to FIG. 2A, the second magnetic part 343 of the magnetic system corresponds, spatially and magnetically, with the first magnetic part 341 of the magnetic system of the arm attachment portion 201. In some embodiments, the second magnetic part 343 of the magnetic system is a magnet (also called a "lower magnet"). In some embodiments, the lower magnet 343 is a ring magnet.

The locations, orientations, and magnetic strengths of the first magnetic part 341 of the magnetic system and of the second magnetic part 343 of the magnetic system provide sufficient force to hold a load 103 on a tool 116, but still enable the robotic system 100 to easily change tools 116 by sliding off the tool attachment portion 211 in accordance with methods described in this disclosure. If the magnetic force were too strong, for example, the robotic system 100 would be unable to remove the tool attachment portion 211. When the first magnetic part 341 of the magnetic system and the second magnetic part 343 of the magnetic system are firmly attracted to each other via a magnetic force, the magnetic system is considered to be engaged. Otherwise, the magnetic system is considered to be disengaged. In some embodiments, the first magnetic part 341 of the magnetic system is a magnet or a plurality of magnets and the second magnetic part 343 of the magnetic system is a magnet or a plurality of magnets. In some embodiments, the first magnetic part 341 of the magnetic system is a magnet or a plurality of magnets and the second magnetic part 343 of the magnetic system is a component containing a non-magnetized ferromagnetic material. In some embodiments, the first magnetic part 341 of the magnetic system is a component containing a non-magnetized ferromagnetic material and the second magnetic part 343 of the magnetic system is a magnet or a plurality of magnets. In some embodiments, any of the aforementioned magnets is an electromagnet. In some embodiments, any of the aforementioned magnets is a permanent magnet. In some embodiments, the first magnetic part 341 of the magnetic system and the second magnetic part 343 of the magnetic system are each a magnet of similar shape, so that there is sufficient attraction between them. For example, both magnets are ring magnets, or both magnets are square magnets.

The socket 213 corresponds spatially with the pin 203 of the arm attachment 201. In some embodiments, the cross-section of the socket 213 is keyed. In some embodiments, the cross-section of the socket 213 is non-circular. In further embodiments, the cross-section of the socket 213 is a polygon. In further embodiments, the polygon is a hexagon. In some embodiments, the pin 203 and the socket 213 are chamfered, which enables the robotic system 100 to successfully attach the upper portion 201 and lower portion 211 even in the presence of spatial misalignment, which provides enhanced operational stability and repeatability.

In the embodiments shown in FIGS. 2A and 2B, the pin 203 is depicted as a protrusion with a hexagonal cross-section, and the socket 213 is depicted as a depression shaped to receive the pin 203, where the depression is topologically different from a hole. However, various shapes of the pin 203 and socket 213 are possible and apparent to those skilled in the art. For example, the pin 203 may be a protrusion of any cross-sectional shape (e.g., a circle, an ellipse, a polygon) similar to a hill and the socket 213 may be a corresponding valley, so that the arm attachment portion 201 and the tool attachment portion 211 do not rotate when the pin 203 and the socket 213 are engaged.

Figure 2C:
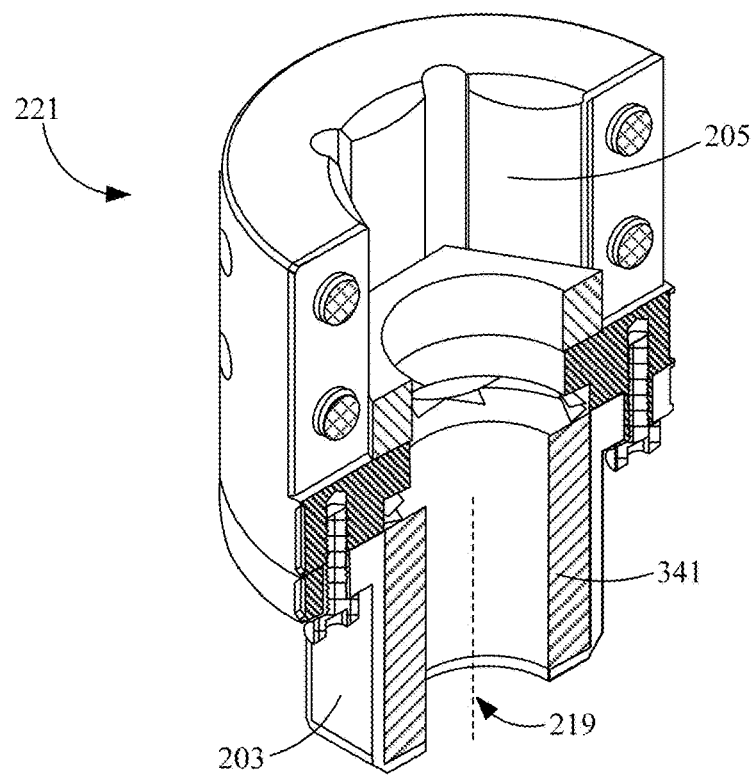
FIG. 2C shows a cutaway view of an example arm attachment portion of an end effector tool changer for a robotic system, in accordance with one embodiment of the invention.
Figure 2D:
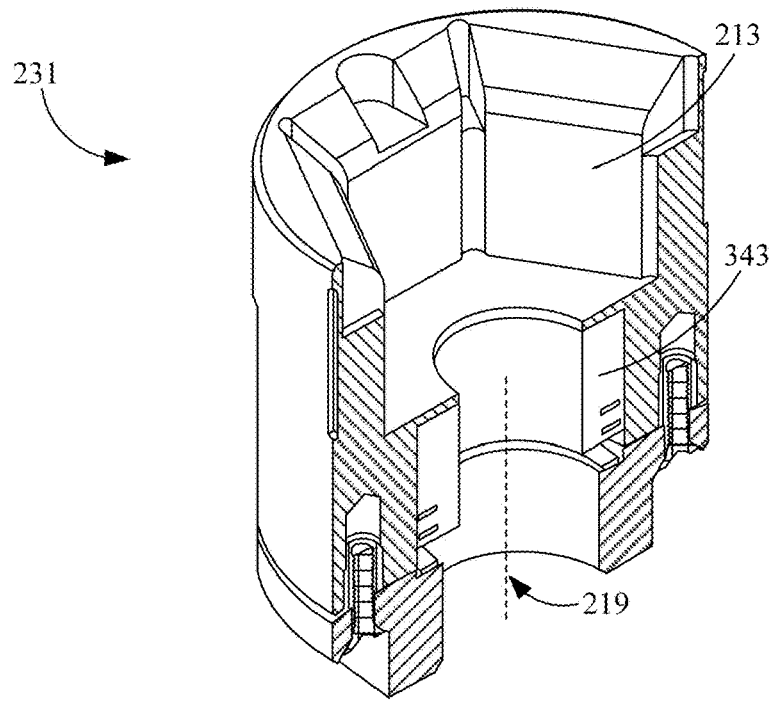
FIG. 2D shows a cutaway view of an example tool attachment portion of an end effector tool changer for a robotic system, in accordance with one embodiment of the invention.
Figure 2E:
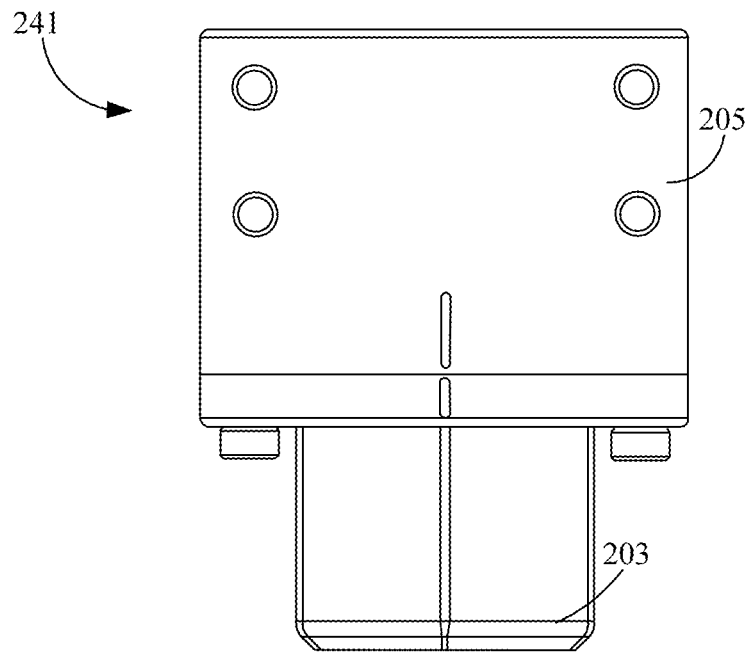
FIG. 2E shows a side view of an example arm attachment portion of an end effector tool changer for a robotic system, in accordance with one embodiment of the invention.
Figure 2F:
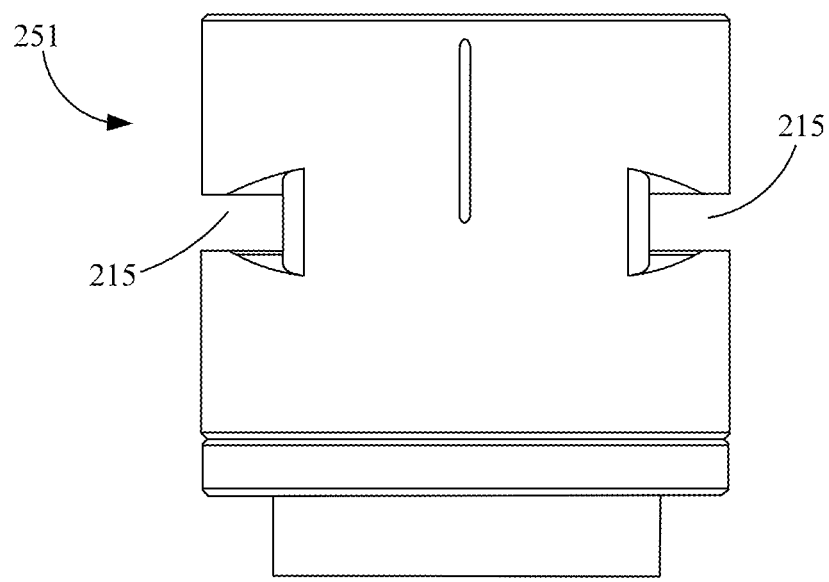
FIG. 2F shows a side view of an example tool attachment portion of an end effector tool changer for a robotic system, in accordance with one embodiment of the invention.
Figure 2G:
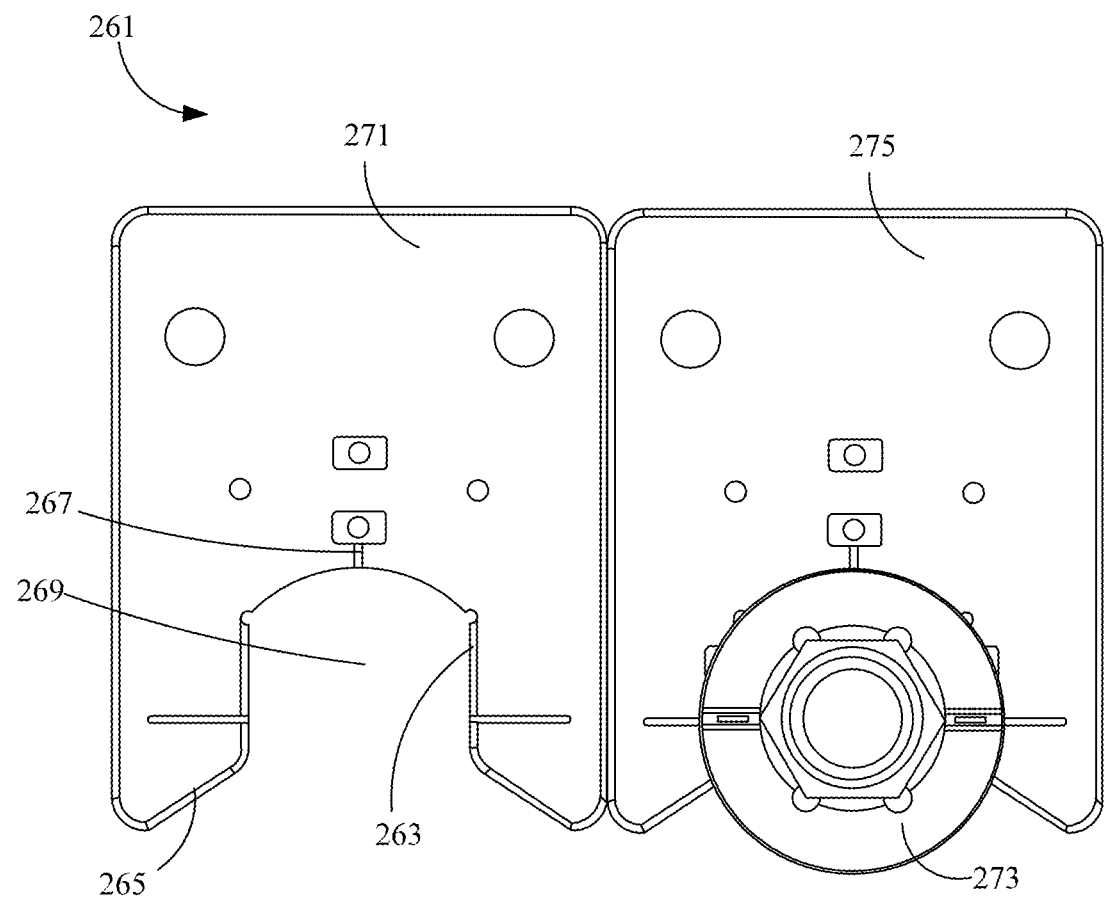
FIG. 2G shows a top view of a pair of example tool plate for a robotic system, in accordance with one embodiment of the invention.

The plurality of rack grooves 215 is designed to complement the slots of the tool plate described in reference to FIG. 2G.

In some embodiments, there is error tolerance built into the size, shape, and locations of the pin 203 and corresponding socket 213. This way, slight misalignments when adding a tool are tolerated. In some embodiments, the tip of the pin 203 is tapered and/or the socket 213 is beveled with wider lips to enable misalignments to be automatically corrected when the pin 203 attempts to enter corresponding socket 213.

In some embodiments, the upper main body 207, including the pin 203, is manufactured from aluminum alloy. In some embodiments, lower main body 209 is manufactured from a softer material, such as nylon or polyoxymethylene (POM). Aluminum alloy sliding on a softer material may support millions of attachments and separations with very little wear and tear.

As would be apparent to a person skilled in the art, there are various configurations of the pin 203 and the socket 213 that are possible. For example, the two components may be switched, so that the tool attachment portion 211 contains the pin 203 and the arm attachment portion 201 contains the socket 213.

The tool attachment portion 211 optionally includes a through-hole (not shown) to interact with a tool 116. The through-hole may align with the through-hole 219 from the arm attachment portion 201 to create a sealed channel for the tool 116 when the arm attachment portion 201 and the tool attachment portion 211 come into contact with each other. A leakage prevention device (e.g., an O-ring, ring foam) may be used to seal the interface between the through-holes 219 of the arm attachment portion 201 and of the tool attachment portion 211. The sealed channel may, in some embodiments, be capable of carrying a vacuum, compressed air, mechanical connections, or electrical connections. In some embodiments, the through-holes 219 are centered on the faces of the tool attachment portion 211 and the arm attachment portion 201, respectively. In some embodiments, the tool attachment portion 211 includes a plurality of through-holes, each of which may be any of the aforementioned types.

FIG. 2C shows a cutaway view 211 of an example arm attachment portion 201 of an end effector tool changer 117 for a robotic system 100, in accordance with one embodiment of the invention. The components shown are further discussed with reference to FIGS. 3D, 3E, and 4A.

FIG. 2D shows a cutaway view 231 of an example tool attachment portion 211 of an end effector tool changer 117 for a robotic system 100, in accordance with one embodiment of the invention. The components shown are further discussed with reference to FIGS. 3D, 3E, and 4B.

FIG. 2E shows a side view 241 of an example arm attachment portion 201 of an end effector tool changer 117 for a robotic system 100, in accordance with one embodiment of the invention.

FIG. 2F shows a side view of an example tool attachment portion of an end effector tool changer for a robotic system, in accordance with one embodiment of the invention.

FIG. 2G shows a top view of a pair of example tool plate for a robotic system 100, in accordance with one embodiment of the invention. The tool plate 271 on the left is shown as empty, i.e., it is not holding any tool attachment portions. In contrast, the tool plate 275 on the right is shown as full, i.e., it is holding a tool attachment portion 273. In some embodiments, a tool plate 271, 275 is part of a tool rack, as described with reference to FIGS. 1A, 1B, and 1C. The tool plate 271, 275 includes a slot 269 whose dimensions correspond to those of the plurality of rack grooves 215 from the tool attachment portion 273 in order to enable the tool plate 271, 275 to firmly hold the tool attachment portion 273 in the slot 269 via the edge 263. In some embodiments, the tool plate 271, 275 further includes a tapered slot 265 to allow for slight misalignments to be automatically corrected. Note that the tool plates 271, 275 shown in FIG. 2G may differ from those shown as a component in other figures in this disclosure; such displays merely illustrate embodiments of the tool plate, and that various combinations of components shown may be readily combined.

In some embodiments, the tool plate 271, 275 is made of mild steel or other ferromagnetic material. When the tool attachment portion 273 is docked in the tool plate 271, 275, the lower magnet 343 in the tool attachment portion 273 attracts the tool plate 271, 275, which ensures that the tool attachment portion 273 returns to a repeatable position in the tool plate 271, 275.

In some embodiments, the tool plate 271, 275 has hole features 267 that allow for mounting presence sensors 119, which monitor whether or not a tool attachment portion 273 is in the docked position. Some examples of these sensors 119 are hall-effect sensors, infrared sensors, ultrasonic sensors, and capacitive sensors. This monitoring function allows the system to detect whether a tool attachment portion 273 has fallen off during operations, or has been removed by an operator 101. In some embodiments, the tool plate 271, 275 also has hole features 267 for a magnet assembly. The magnet assembly mounts a permanent magnet close to the lower tool changer assembly docking position, increasing the force retaining the tool attachment portion 273 in the docked position.

Engagement and Disengagement of the End Effector Tool Changer

Figure 3A:
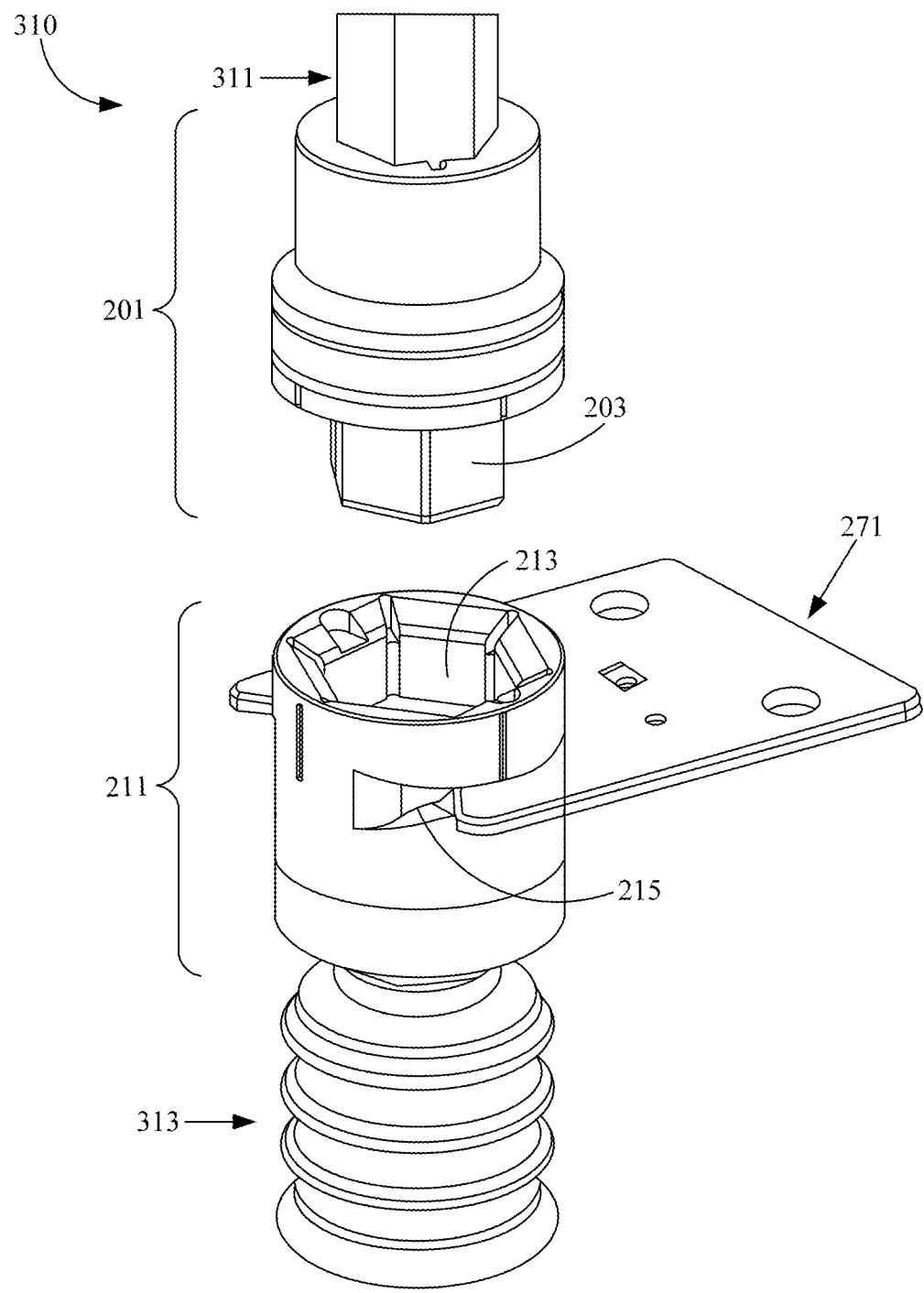
FIG. 3A shows an isometric view of an example disengaged end effector tool changer for a robotic system, in accordance with one embodiment of the invention.

FIG. 3A shows an isometric view of an example disengaged end effector tool changer 117 for a robotic system 100, in accordance with one embodiment of the invention.

Figure 3B:
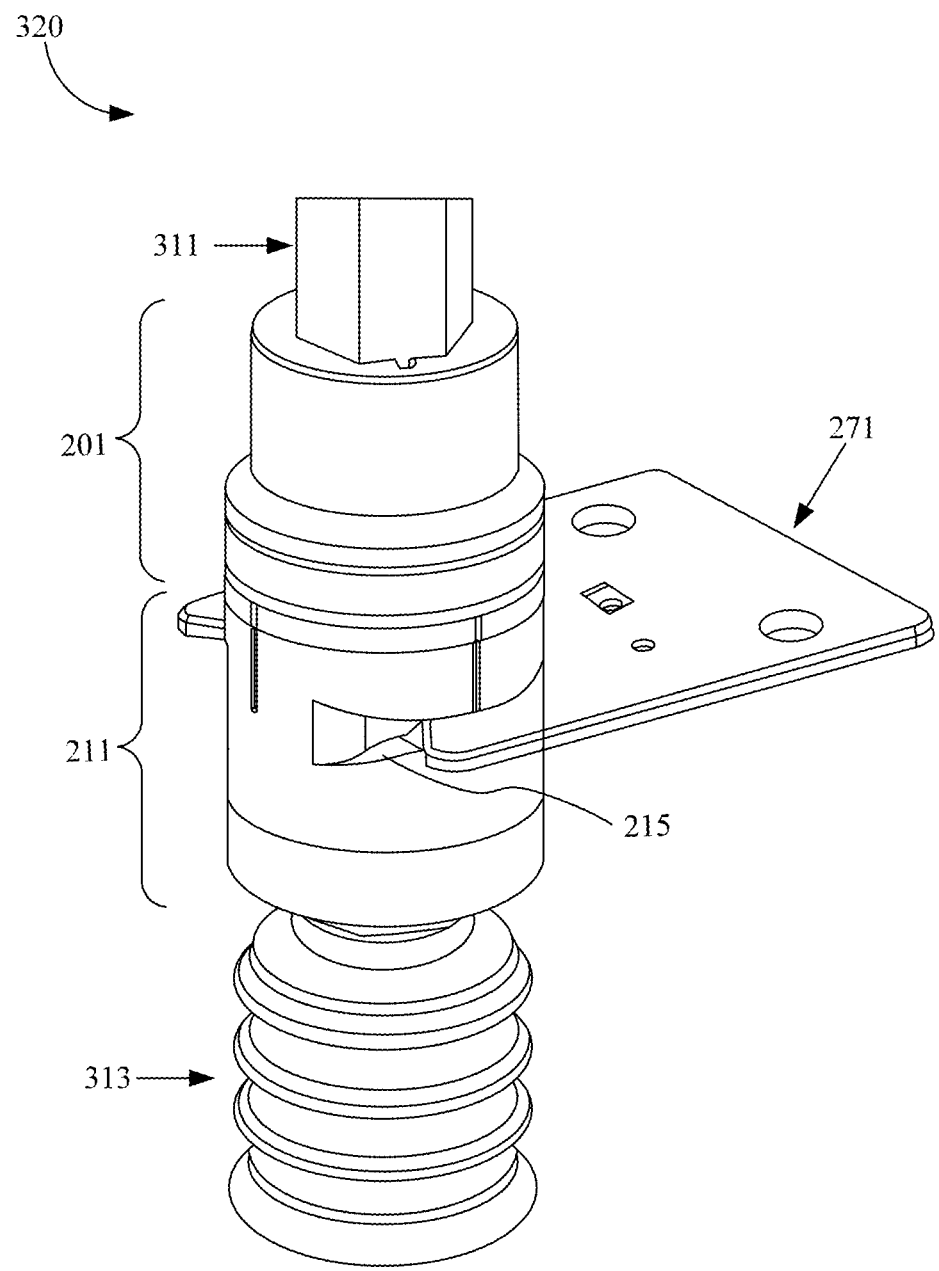
FIGS. 3B and 3C show isometric views of example engaged end effector tool changers for a robotic system, in accordance with one embodiment of the invention.
Figure 3C:
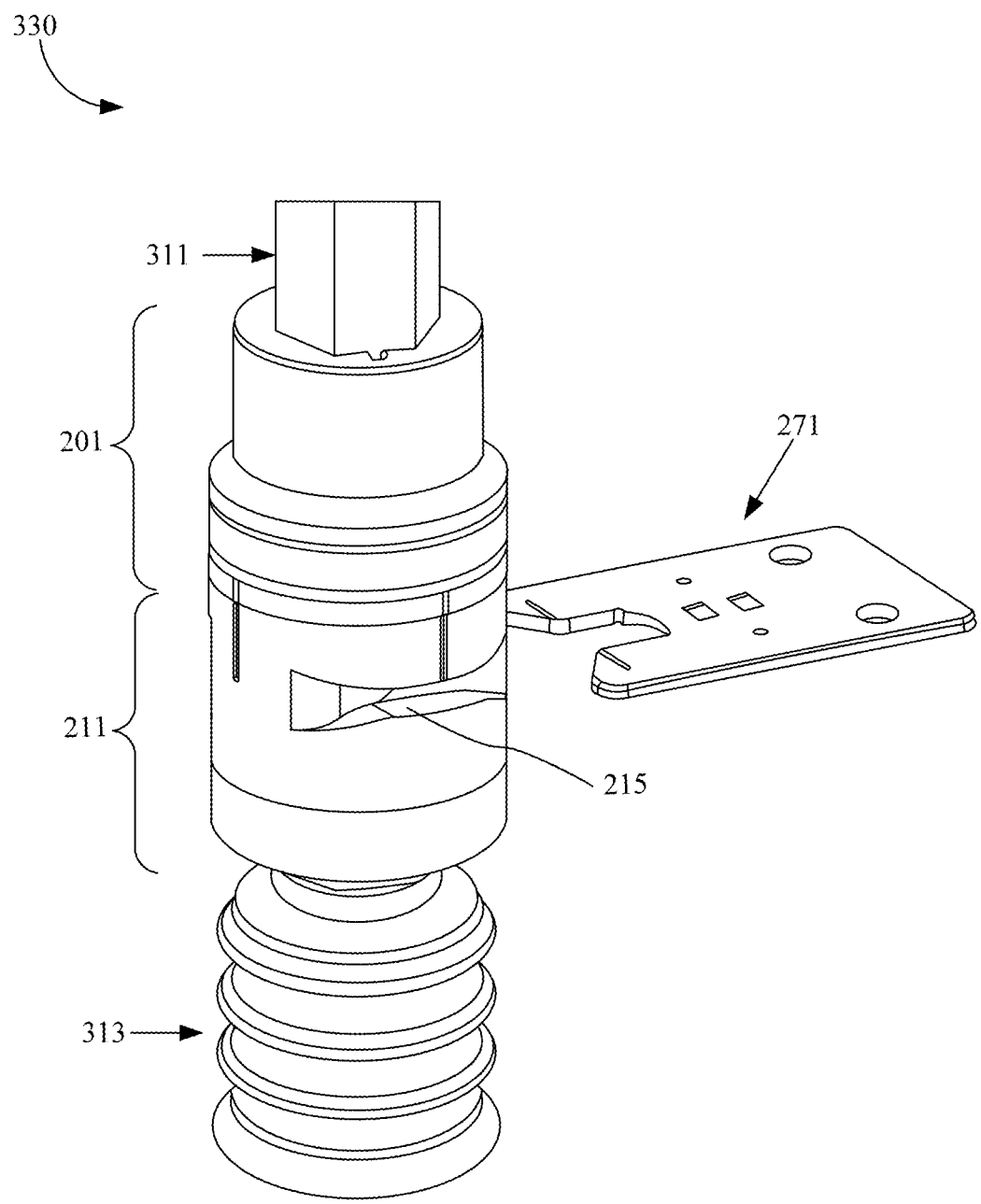

FIGS. 3B and 3C show isometric views of example engaged end effector tool changers 117 for a robotic system 100, in accordance with one embodiment of the invention. In FIG. 3B, the tool attachment portion 211 is docked in the tool plate 271. In contrast, in FIG. 3C, the tool attachment portion 211 is not docked in the tool plate 271.

Figure 3D:
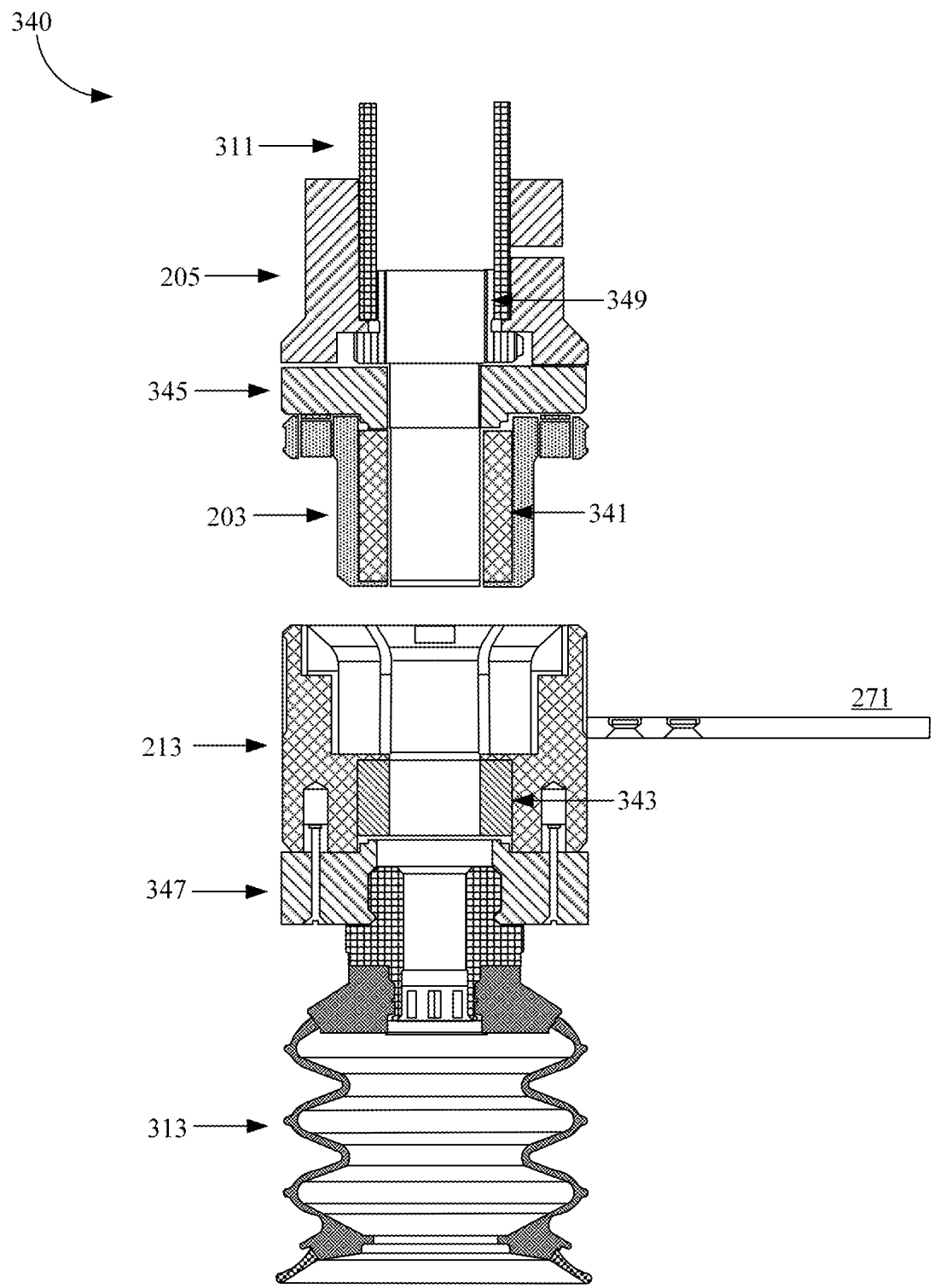
FIG. 3D shows a cutaway view of an example disengaged end effector tool changer for a robotic system, in accordance with one embodiment of the invention.
Figure 3E:
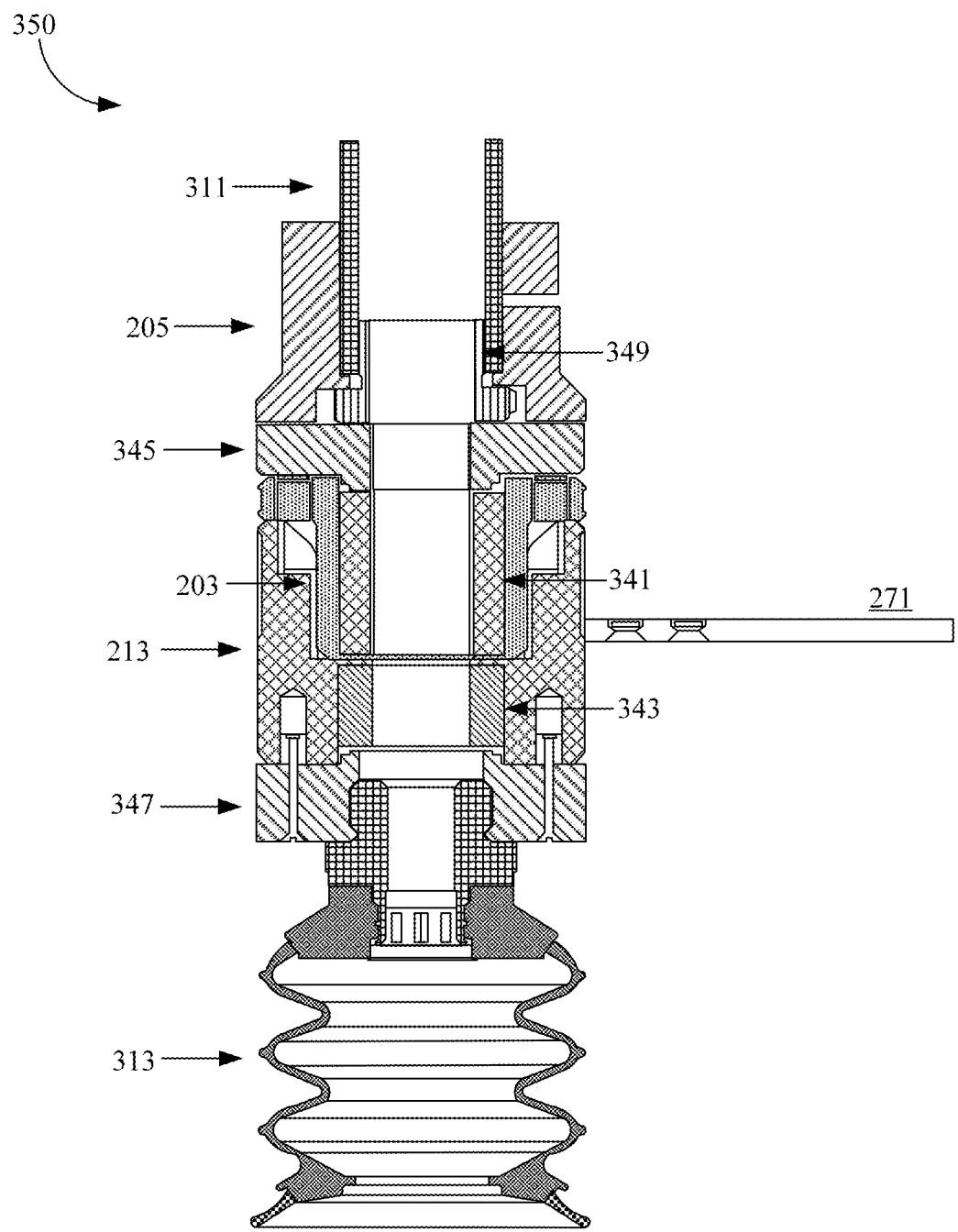
FIG. 3E shows a cutaway view of an example engaged end effector tool changer for a robotic system, in accordance with one embodiment of the invention.

FIG. 3D shows a cutaway view of an example disengaged end effector tool changer 117 for a robotic system 100, in accordance with one embodiment of the invention. FIG. 3E shows a cutaway view of an example engaged end effector tool changer 117 for a robotic system 100, in accordance with one embodiment of the invention.

With reference to FIGS. 3A, 3B, 3C, 3D and 3E, the arm attachment portion ("upper assembly") 201 comprises a first magnetic part 341 of a magnetic system (e.g., an upper magnet) and a pin 203. In some embodiments, the cross-section of the pin 203 is keyed. In some embodiments, the cross-section of the pin 203 is non-circular. In further embodiments, the cross-section of the pin 203 is a polygon. In further embodiments, the polygon is a hexagon. In some embodiments, the arm attachment portion 201 further comprises a shaft clamp 205, a clamping screw 411, a shaft fitting 349, an upper magnet backing plate 345, a first plurality of assembly screws 413, and a plurality of orientation-indicating screws 415. The shaft clamp 205 is secured to the shaft 311 via the shaft fitting 349, which threads into the bottom of the shaft 311 and the clamping screw 411. The upper magnet backing plate 345 is fastened to the shaft clamp 205 using the first plurality of assembly screws 413. The upper magnet 341 is slipped into a cavity in the pin 203, and the pin 203 is fastened to the upper magnet backing plate 345 with the first plurality of assembly screws 413. The upper magnet backing plate 345 may include a circular boss feature in its center, which registers against the top surface of the upper magnet 341. The parts may be dimensioned such that the upper magnet 341 is in direct contact with the upper magnet backing plate 345, which prevents rattling during operation of the tool changer 117. The plurality of orientation-indicating screws 415 is threaded into the pin 203, and when the lower assembly 211 is connected to the upper assembly 201 in the correct orientation, the screws 415 register into a plurality of holes in the lower assembly 211. If the lower assembly 211 is not in the correct orientation, the screws 415 would prevent the lower assembly 211 from fully mating with the upper assembly 201. This ensures that the operator 101 does not manually connect a lower assembly 211 in the wrong orientation (i.e., rotated out of position). In some embodiments, the shaft clamp 205, the upper magnet backing plate 345, and the pin 203 are made of aluminum alloys. In some embodiments, the shaft fitting 349 is made of brass, the upper magnet 341 is made of a neodymium alloy, and the first plurality of assembly screws 413 are made of alloy steel.

With reference to FIGS. 3A, 3B, 3C, 3D and 3E, the tool attachment portion 211 ("lower assembly") comprises a second magnetic part 343 of the magnetic system (e.g., a lower magnet), a socket 213, and a plurality of rack grooves 215. In some embodiments, the cross-section of the socket 213 is keyed. In some embodiments, the cross-section of the socket 213 is non-circular. In further embodiments, the cross-section of the socket 213 is a polygon. In further embodiments, the polygon is a hexagon. In some embodiments, the tool attachment portion 211 further comprises a lower magnet backing plate 347 and a second plurality of assembly screws 451. The lower magnet 343 slips into a cavity in the socket 213. Similar to the upper assembly 201, the lower magnet backing plate 347 may include a circular center boss, which applies pressure to the bottom face of the lower magnet 343, ensuring that the lower magnet 343 does not rattle during operation. The lower magnet backing plate 347 is secured to the socket 213 via the second plurality of assembly screws 451. In some embodiments, the socket 213 is made of nylon, the lower magnet 343 is made of a neodymium alloy, the lower magnet backing plate 347 is made of an aluminum alloy, and the second plurality of assembly screws 451 are made of alloy steel.

A major advantage of the disclosed design is the ability to precisely control the magnet-to-magnet distance, which is directly related to the magnetic retention force between the upper assembly 201 and the lower assembly 211. Because there is no air gap between the lower magnet 343 and the upper magnet 341, they are snug at the bottom of their respective cavities. The parts are dimensioned such that the bottom face of the pin will always be in direct contact with the bottom of the socket 213. Thus, the upper magnet 341 and the lower magnet 343 are separated only by their housing shells, which are manufactured to precise tolerances.

In other embodiments, the shaft fitting 349 is removed from the upper assembly 201, and the shaft clamp 205 and the upper magnet backing plate 345 are combined into a single part. This embodiment may include a shaft O-ring to seal the bottom of the shaft 311. In yet another embodiment, the pin 203 is fastened directly to the shaft clamp 205. Furthermore, the upper magnet backing plate 345 is either replaced by a smaller diameter plate, or eliminated entirely by using a feature on the shaft clamp 205 or the shaft fitting 349 to apply pre-load directly to the face of the upper magnet 341.

Construction of the End Effector Tool Changer

Figure 4A:
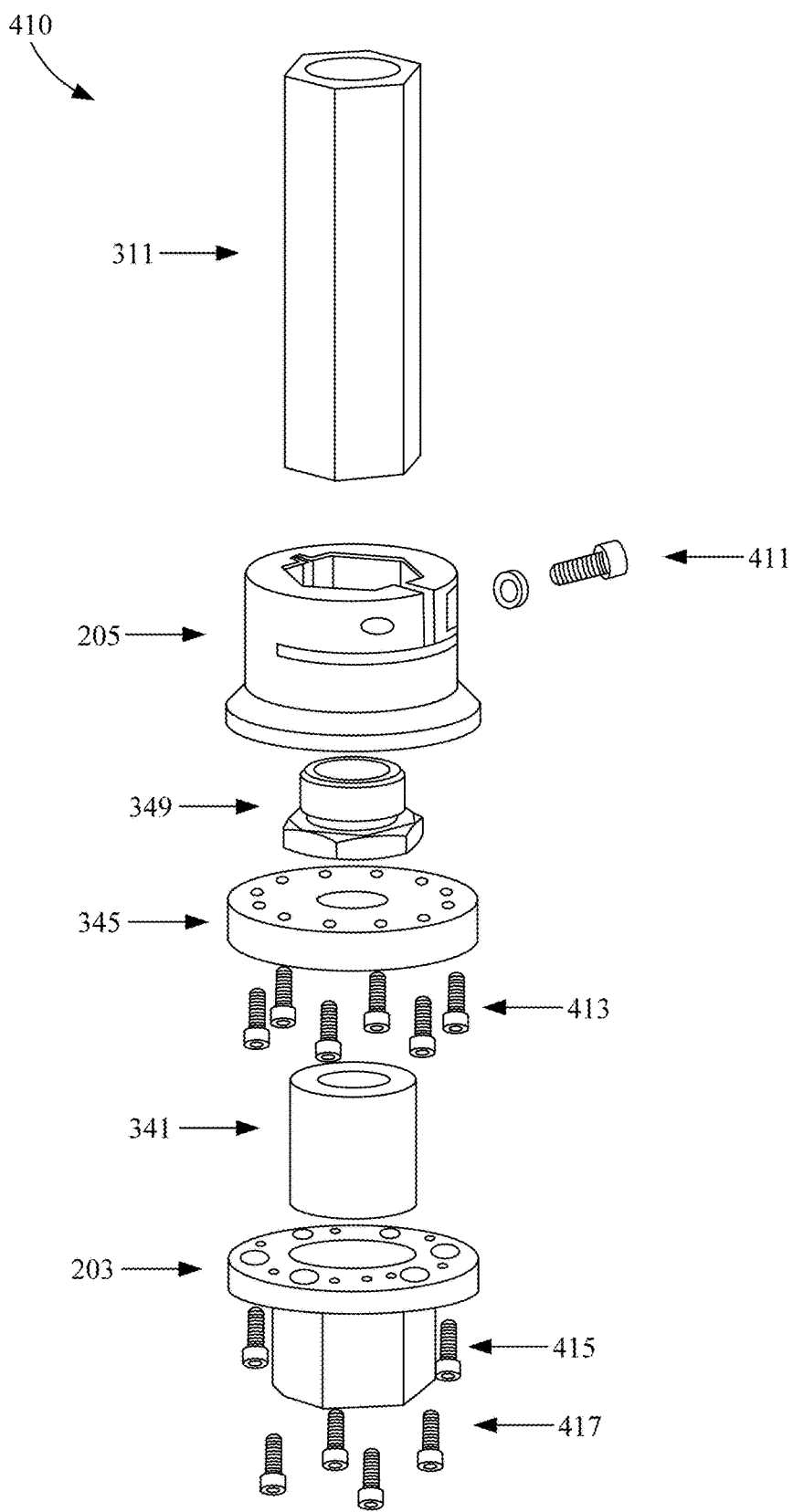
FIG. 4A shows an exploded view of an example arm attachment portion of an end effector tool changer for a robotic system, in accordance with one embodiment of the invention.

FIG. 4A shows an exploded view of an example arm attachment portion 201 of an end effector tool changer 117 for a robotic system 100, in accordance with one embodiment of the invention.

Figure 4B:
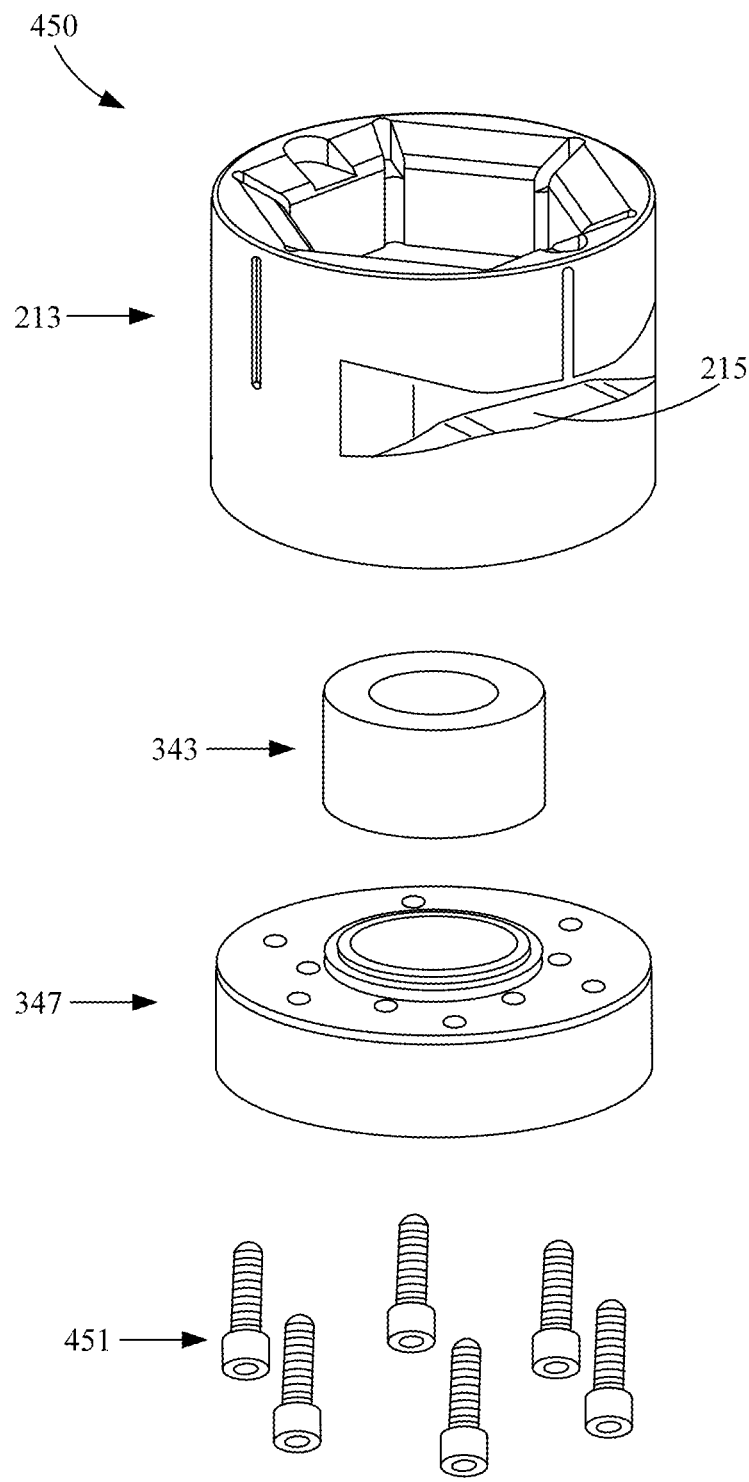
FIG. 4B shows an exploded view of an example tool attachment portion of an end effector tool changer for a robotic system, in accordance with one embodiment of the invention.

FIG. 4B shows an exploded view of an example tool attachment portion 211 of an end effector tool changer 117 for a robotic system 100, in accordance with one embodiment of the invention.

Figure 5:
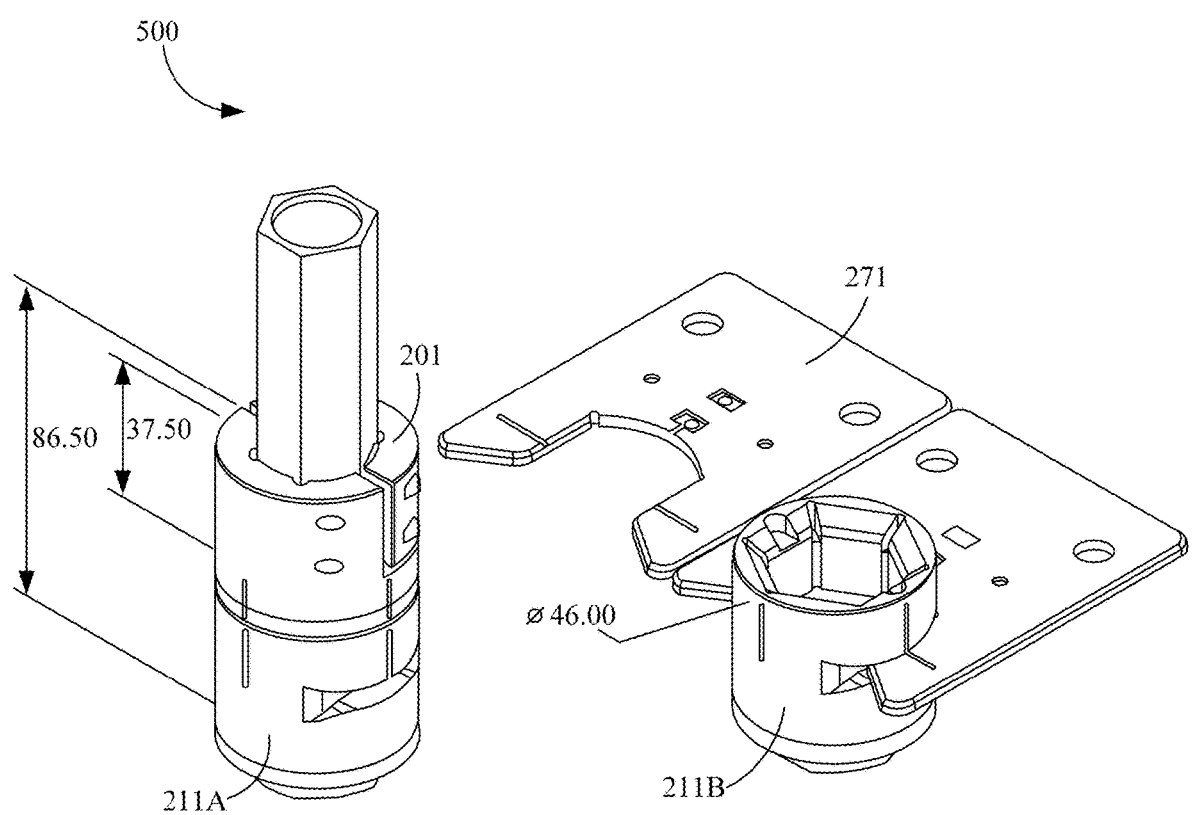
FIG. 5 shows an example end effector tool changer with exemplary dimensions for a robotic system, in accordance with one embodiment of the invention.

FIG. 5 shows an example end effector tool changer 117 with exemplary dimensions for a robotic system 100, in accordance with one embodiment of the invention.

States of the End Effector Tool Changer

FIGS. 6A, 6B, 6C, 6D, 6E, and 6F show various example states of an end effector tool changer 117 for a robotic system 100, in accordance with one embodiment of the invention. In these example states, an arm attachment portion 609 is attached to the arm 102 of a robotic system 100. The arm attachment portion 609 is accessible to a tool rack 621 including a plurality of tool plates and a plurality of slots, including a first slot 601 and a second slot 603. The tool rack 621 is able to hold a plurality of tool attachment portions, including a first tool attachment portion 605 and a second tool attachment portion 607. In some embodiments, the first tool attachment portion 605 is attached to a first gripper of the robotic system 100. In some embodiments, the second tool attachment portion 607 is attached to a second gripper of the robotic system 100.

Figure 6A:
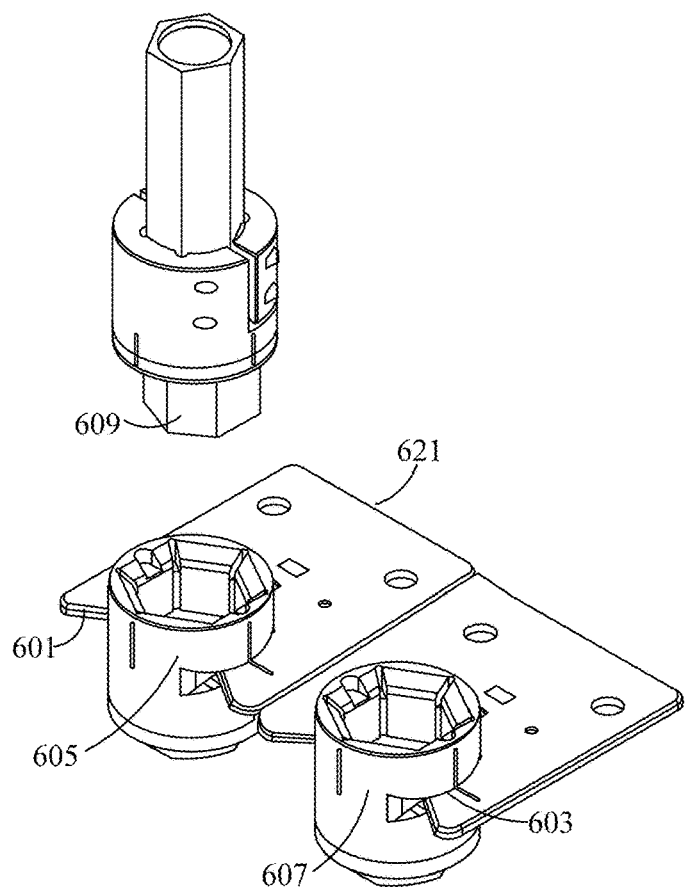
FIGS. 6A, 6B, 6C, 6D, 6E, and 6F show various example states of an end effector tool changer for a robotic system, in accordance with one embodiment of the invention.

FIG. 6A shows an example state of an end effector tool changer 117, where the first tool attachment portion 605 and the second tool attachment portion 607 are held in the first slot 601 and the second slot 603, respectively, the arm attachment portion 609 is engaged with neither the first tool attachment portion 605 nor the second tool attachment portion 607, and the arm attachment portion 609 is ready to be engaged with the first tool attachment portion 605.

Figure 6B:
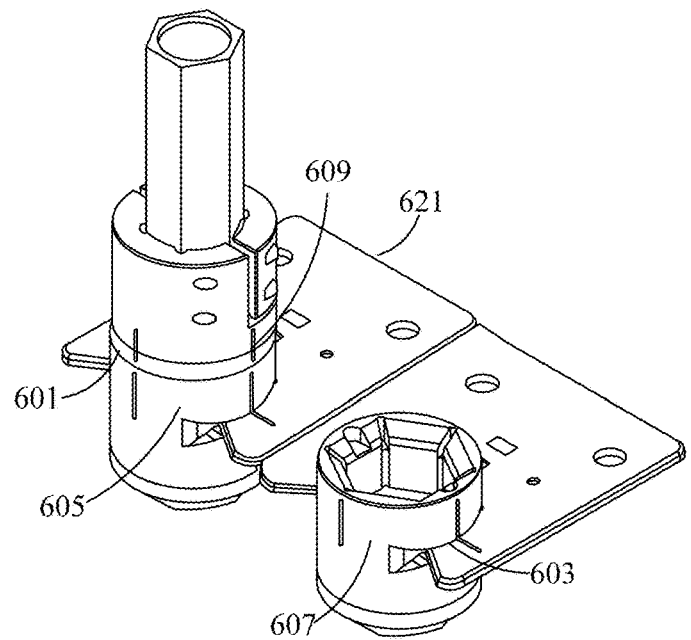

FIG. 6B shows an example state of an end effector tool changer 117, where the first tool attachment portion 605 and the second tool attachment portion 607 are held in the first slot 601 and the second slot 603, respectively, and the arm attachment portion 609 is engaged with the first tool attachment portion 605.

Figure 6C:
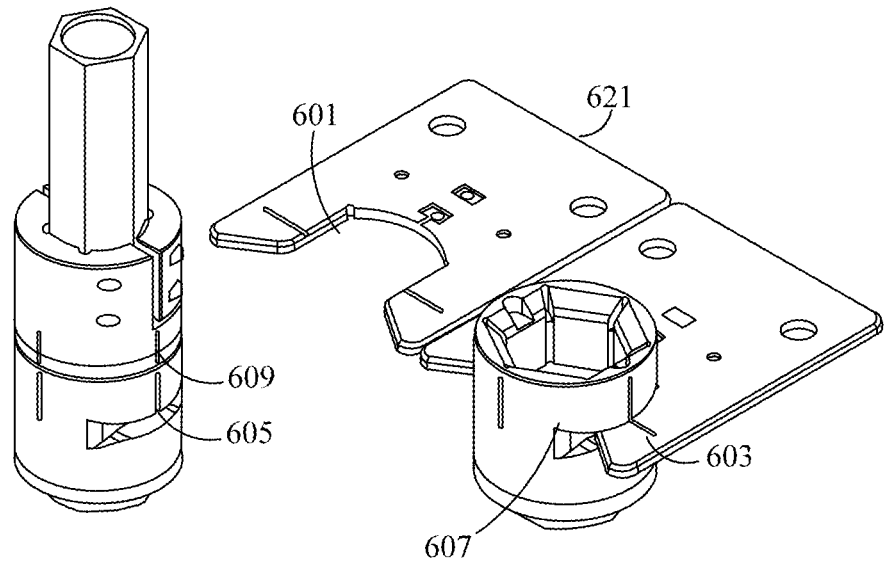

FIG. 6C shows an example state of an end effector tool changer 117, where the second tool attachment portion 607 is held in the second slot 603, the first slot 601 is empty, and the arm attachment portion 609 is engaged with the first tool attachment portion 605 away from the tool rack 621.

Figure 6D:
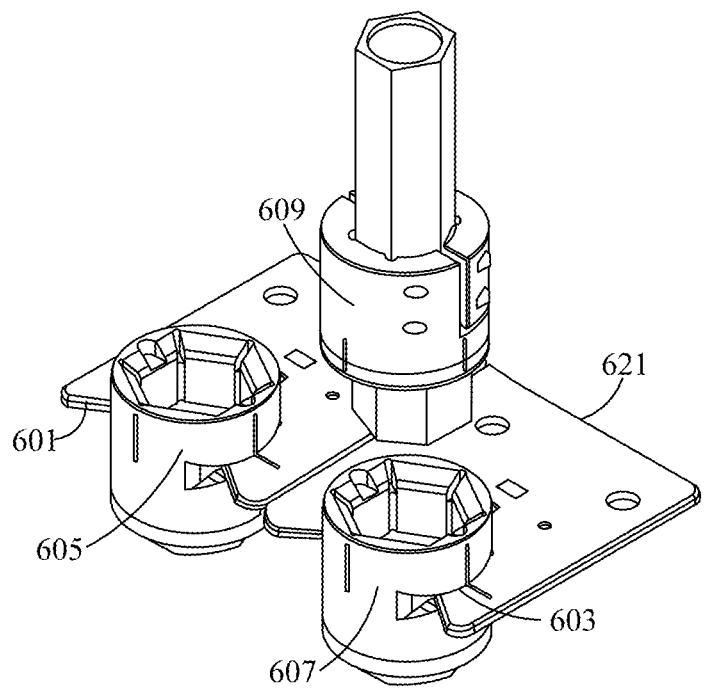

FIG. 6D shows an example state of an end effector tool changer 117, where the first tool attachment portion 605 and the second tool attachment portion 607 are held in the first slot 601 and the second slot 603, respectively, the arm attachment portion 609 is engaged with neither the first tool attachment portion 605 nor the second tool attachment portion 607, and the arm attachment portion 609 is ready to be engaged with the second tool attachment portion 607.

Figure 6E:
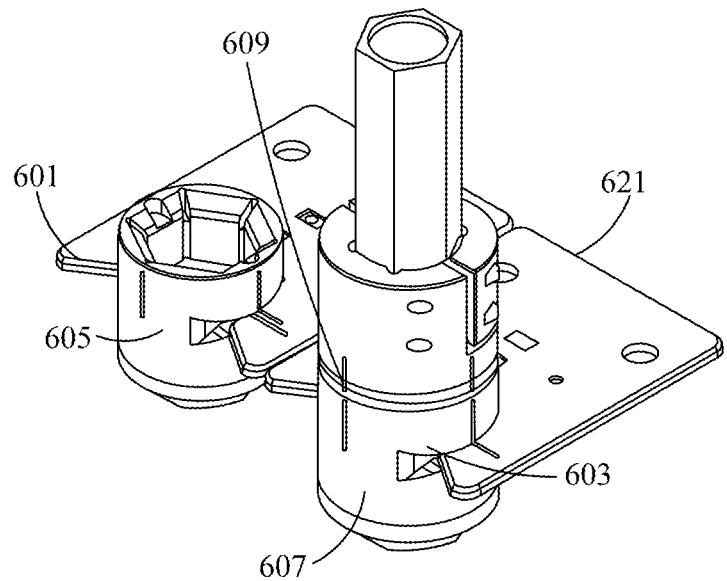

FIG. 6E shows an example state of an end effector tool changer 117, where the first tool attachment portion 605 and the second tool attachment portion 607 are held in the first slot 601 and the second slot 603, respectively, and the arm attachment portion 609 is engaged with the second tool attachment portion 607.

Figure 6F:
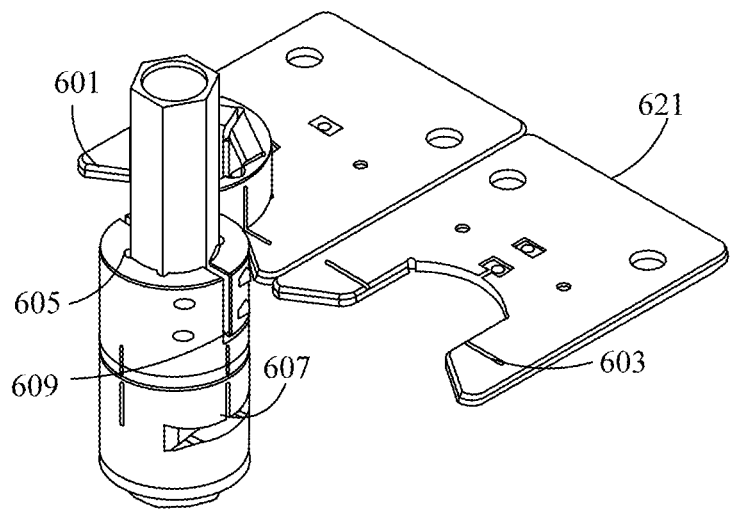

FIG. 6F shows an example state of an end effector tool changer 117, where the first tool attachment portion 605 is held in the first slot 601, the second slot 603 is empty, and the arm attachment portion 609 is engaged with the second tool attachment portion 607 away from the tool rack 621.

State Flows of the End Effector Tool Changer

Figure 7:
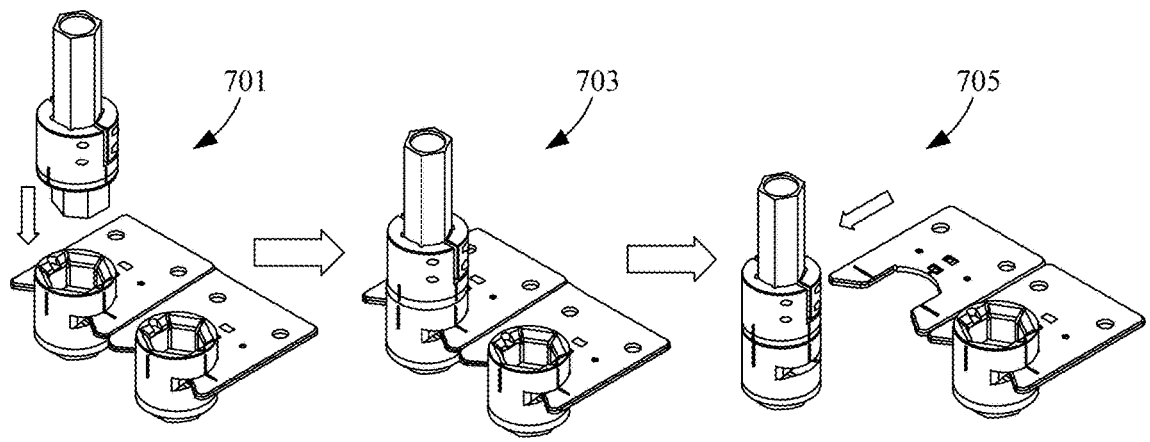
FIG. 7 shows an example state flow for tool retrieval for an end effector tool changer for a robotic system, in accordance with one embodiment of the invention.
Figure 8:
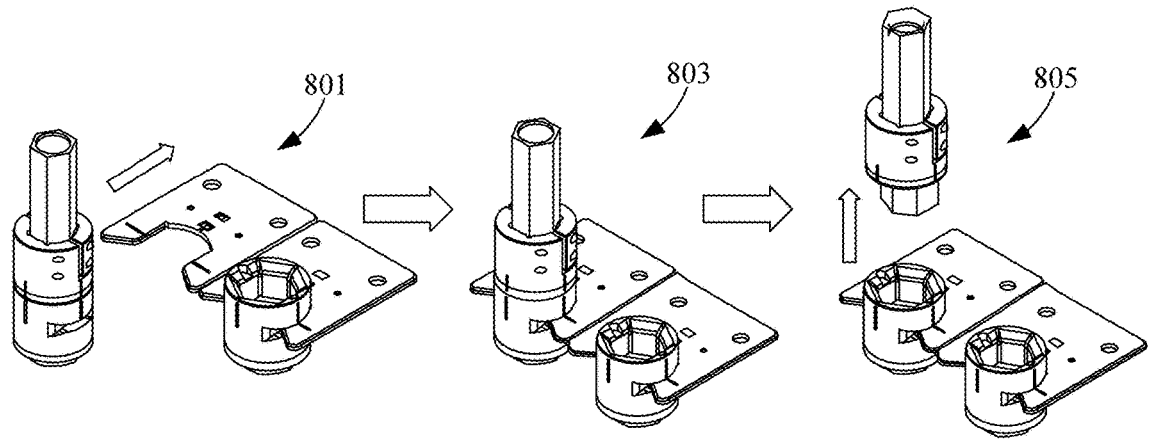
FIG. 8 shows an example state flow for tool storage for an end effector tool changer for a robotic system, in accordance with one embodiment of the invention.
Figure 9:
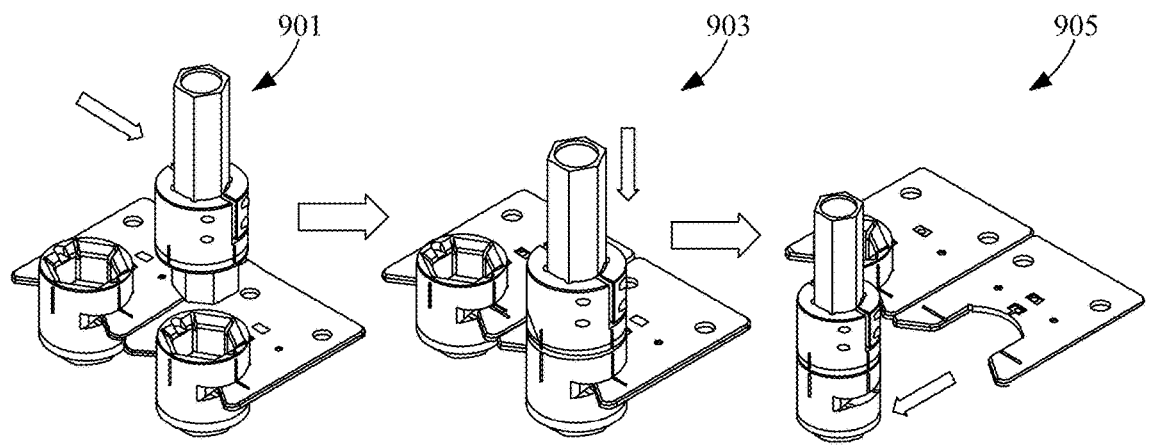
FIG. 9 shows an example state flow for tool switching for an end effector tool changer for a robotic system, in accordance with one embodiment of the invention.

FIGS. 7, 8, and 9 show example state flows for various actions of an end effector tool changer 117 for a robotic system 100, in accordance with one embodiment of the invention. In these example state flows, the states correspond to the example states depicted in FIGS. 6A, 6B, 6C, 6D, 6E, and 6F.

FIG. 7 shows an example state flow for tool retrieval for an end effector tool changer 117 for a robotic system 100, in accordance with one embodiment of the invention. In some embodiments, tool retrieval is used by the system 100 in order to load a tool 116 onto an arm 102 of the system 100. The system 100 begins in state 701, which is depicted in FIG. 6A. Next, the system 100 retrieves the first tool attachment portion 605 by engaging the arm attachment portion 609 with the first tool attachment portion 605, which places the system 100 in state 703, as depicted in FIG. 6B. Finally, the system 100 moves the first tool attachment portion 605 out of the first slot 601 and away from the tool rack 621, which places the system 100 in state 705, as depicted in FIG. 6C. The first tool attachment portion 605 is now retrieved and ready for use.

FIG. 8 shows an example state flow for tool storage for an end effector tool changer 117 for a robotic system 100, in accordance with one embodiment of the invention. Tool storage may be considered the opposite of tool retrieval. In some embodiments, tool storage is used by the system 100 in order to unload a tool 116 from an arm 102 of the system 100. The system 100 begins in state 801, which is depicted in FIG. 6C. Next, the system 100 stores the first tool attachment portion 605 by moving the first tool attachment portion 605 toward the tool rack 621 and into the first slot 601, which places the system 100 in state 803, as depicted in FIG. 6B. Finally, the system 100 disengages the arm attachment portion 609 from the first tool attachment portion 605, which places the system 100 in state 805, as depicted in FIG. 6A. The first tool attachment portion 605 is now stored in the tool rack 621.

FIG. 9 shows an example state flow for tool switching for an end effector tool changer 117 for a robotic system 100, in accordance with one embodiment of the invention. The system 100 begins in a state depicted in FIG. 6A, where the system 100 had previously disengaged the arm attachment portion 609 from the first tool attachment portion 605. Next, the system 100 moves the arm attachment portion 609 near the second tool attachment portion 607 so that the arm attachment portion 609 is ready to be engaged with the second tool attachment portion 607, which places the system 100 in state 901, as depicted in FIG. 6D. Next, the system 100 switches to the second tool attachment portion 607 by engaging the arm attachment portion 609 with the second tool attachment portion 607, which places the system 100 in state 903, as depicted in FIG. 6E. Finally, the system 100 moves the second tool attachment portion 607 out of the second slot 603 and away from the tool rack 621, which places the system 100 in state 905, as depicted in FIG. 6F. The second tool attachment portion 607 is now retrieved and ready for use.

Loading and Unloading the End Effector Tool Changer

Figure 10:
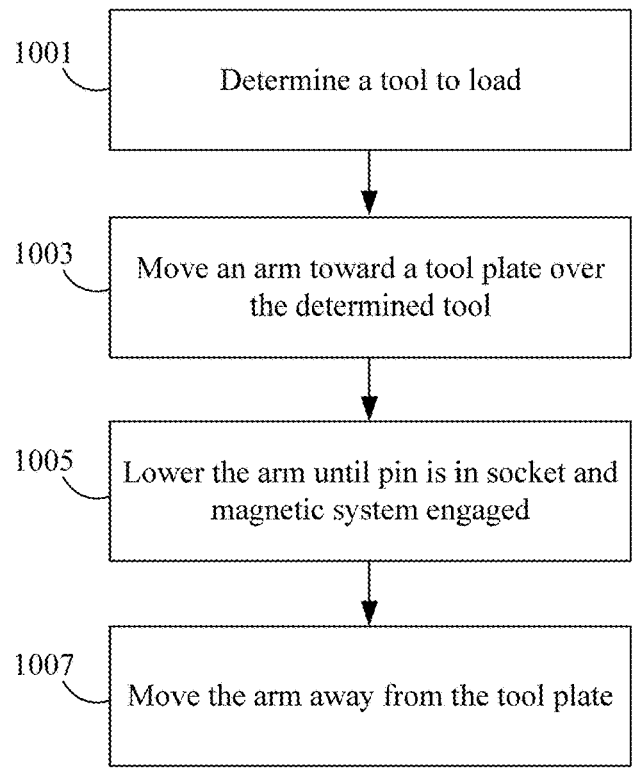
FIG. 10 shows an illustrative flow diagram for loading an end effector tool for a robotic system, in accordance with one embodiment of the invention.

FIG. 10 shows an illustrative flow diagram for loading an end effector tool for a robotic system, in accordance with one embodiment of the invention. FIG. 10 begins (step 1001) by determining a tool to load. In step 1003, the system moves the arm toward the tool plate over the determined tool from step 1001. In step 1005, the system lowers the arm until the pin is in the corresponding socket and the magnetic system is engaged. In step 1007, the system moves the arm away from the tool plate and is ready for use.

Figure 11:
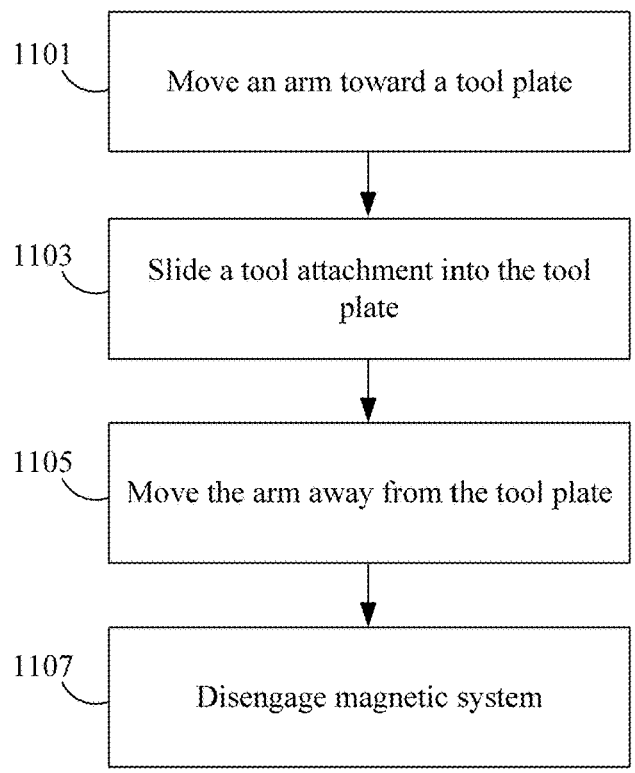
FIG. 11 shows an illustrative flow diagram for unloading an end effector tool for a robotic system, in accordance with one embodiment of the invention.

FIG. 11 shows an illustrative flow diagram for unloading an end effector tool for a robotic system, in accordance with one embodiment of the invention. FIG. 11 begins (step 1101) by moving the arm toward the tool plate. In step 1103, the system slides the tool attachment into the tool plate, where the grooves of the tool attachment portion slide into the slot of the tool plate. In step 1105, the system moves the arm away from the tool plate. In step 1107, the magnetic system is disengaged and the arm is free of the tool.

Source Pumps and Sensors Interacting with the End Effector Tool Changer

Figure 12:
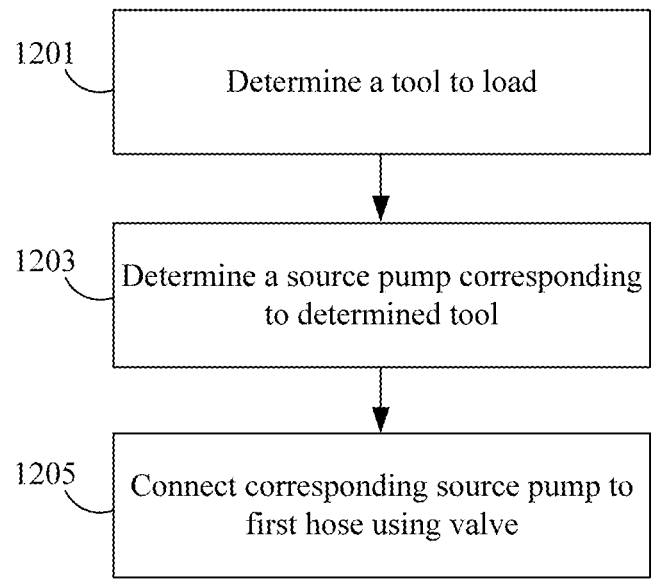
FIG. 12 shows an illustrative flow diagram for connecting a source pump corresponding to an end effector tool for a robotic system, in accordance with one embodiment of the invention.

FIG. 12 shows an illustrative flow diagram for connecting a source pump corresponding to an end effector tool for a robotic system, in accordance with one embodiment of the invention. FIG. 12 begins (step 1201) by determining a tool to load. In step 1203, the system determines a source pump corresponding to the end effector tool determined from step 1201. In step 1205, the system connects the corresponding source pump to the first hose using the valve (see FIGS. 1A and 1B).

In one embodiment, the control system sends a signal to the valve to switch from one valve output to another through a data link. In one embodiment, the plurality of available tools are categorized by their corresponding source pump. For example, suction tools may require a compressed air pump whereas gripping tools may require a vacuum pump.

Figure 13:
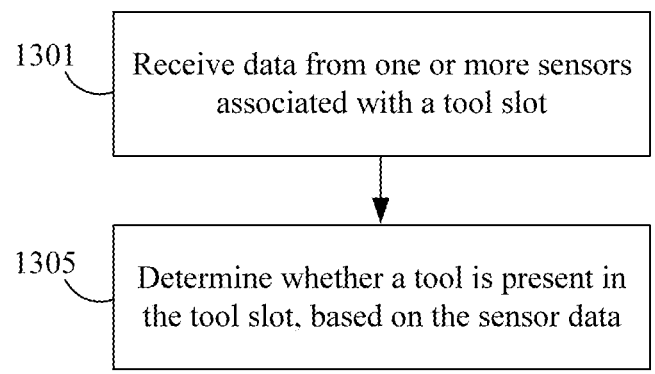
FIG. 13 shows an illustrative flow diagram for determining whether an end effector tool is present at a given tool slot on the tool rack using the tool sensors, in accordance with one embodiment of the invention.

FIG. 13 shows an illustrative flow diagram for determining whether an end effector tool is present at a given tool slot on the tool rack using the tool sensors, in accordance with one embodiment of the invention. In step 1301, the robotic system receives data from one or more sensors associated with a tool slot. In step 1305, the system determines whether a tool is present in the tool slot, based on the sensor data received from step 1301.

Figure 14A:
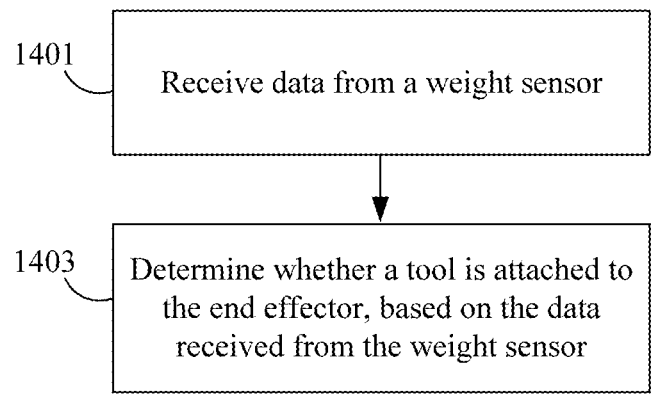
FIG. 14A shows an illustrative flow diagram for determining whether a tool is present at the end effector using a weight sensor, for a robotic system, in accordance with one embodiment of the invention.

FIG. 14A shows an illustrative flow diagram for determining whether a tool is present at the end effector using a weight sensor, for a robotic system, in accordance with one embodiment of the invention. FIG. 14A begins (step 1401) by receiving data from a weight sensor. In step 1403, the system determines whether a tool is attached to the end effector, based on the data received from the weight sensor from step 1401.

In one embodiment of step 1403, the system compares a weight reading from the weight sensor with a known weight of an attached tool, where a weight reading close to the known weight indicates that there is a tool attached to the end effector.

Figure 14B:
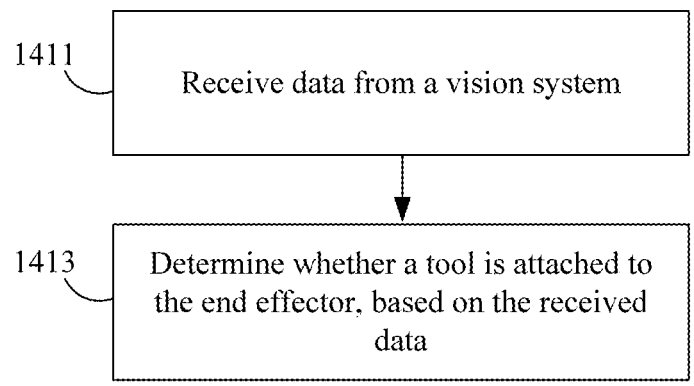
FIG. 14B shows an illustrative flow diagram for determining whether a tool is present at the end effector using a vision system, for a robotic system, in accordance with one embodiment of the invention.

FIG. 14B shows an illustrative flow diagram for determining whether a tool is present at the end effector using a vision system, for a robotic system, in accordance with one embodiment of the invention. FIG. 14B begins (step 1411) by receiving data from a vision system. In step 1413, the system determines whether a tool is attached to the end effector, based on the data received from the vision system from step 1411.

Figure 14C:
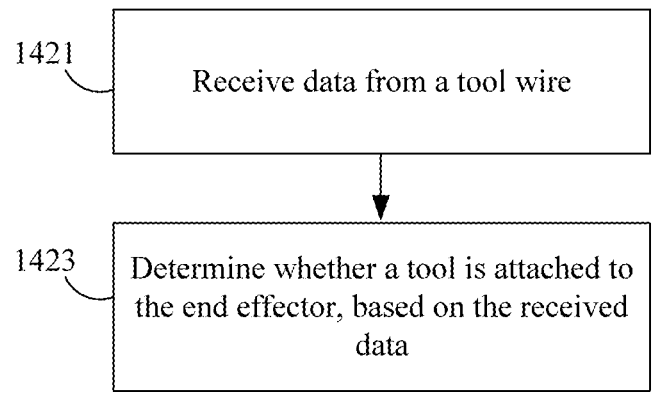
FIG. 14C shows an illustrative flow diagram for determining whether a tool is present at the end effector using a tool wire, for a robotic system, in accordance with one embodiment of the invention.

FIG. 14C shows an illustrative flow diagram for determining whether a tool is present at the end effector using a tool wire, for a robotic system, in accordance with one embodiment of the invention. FIG. 14C begins (step 1421) by receiving data from a tool wire. In step 1423, the system determines whether a tool is attached to the end effector, based on the data received from the tool wire from step 1421. In other embodiments, an electric circuit is configured to indicate the presence of a tool attached to the end effector via the illustrative flow diagram shown in FIG. 14C.

Figure 14D:
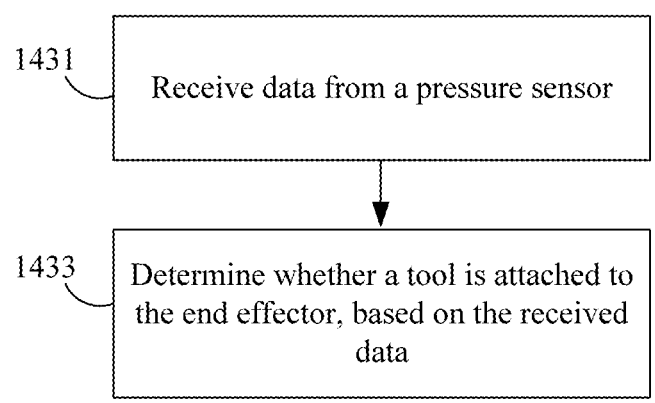
FIG. 14D shows an illustrative flow diagram for determining whether an attached tool is damaged using a pressure sensor, for a robotic system, in accordance with one embodiment of the invention.

FIG. 14D shows an illustrative flow diagram for determining whether an attached tool is damaged using a pressure sensor, for a robotic system, in accordance with one embodiment of the invention. FIG. 14D begins (step 1431) by receiving data from a pressure sensor. In step 1433, the system determines whether a tool attached to the end effector is damaged, based on the data received from the pressure sensor from step 1431.

In one embodiment of step 1433, the system compares a pressure reading from the pressure sensor with atmospheric pressure, where a pressure reading close to the atmospheric pressure indicates that the attached tool is damaged. In another embodiment, a pressure reading close to the atmospheric pressure indicates that there is no tool attached to the end effector.

Figure 15A:
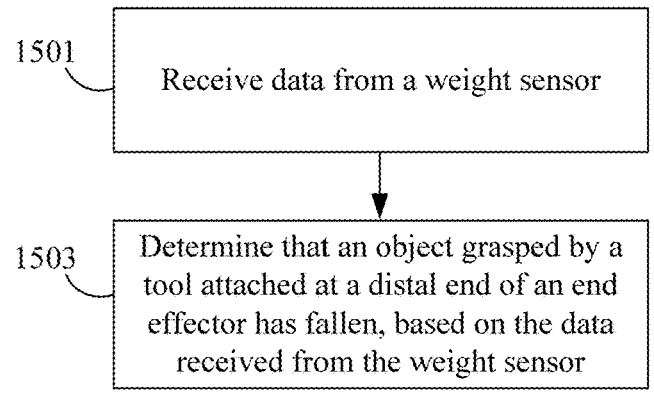
FIG. 15A shows an illustrative flow diagram for a robotic system to detect, using a weight sensor, that an object grasped by an attached tool has fallen, in accordance with one embodiment of the invention.

FIG. 15A shows an illustrative flow diagram for a robotic system to detect, using a weight sensor, that an object grasped by an attached tool has fallen, in accordance with one embodiment of the invention. FIG. 15 begins (step 1501) by receiving data from a weight sensor. In step 1503, the system determines that an object grasped by a tool attached at a distal end of an end effector has fallen, based on the data received from the weight sensor from step 1501.

Figure 15B:
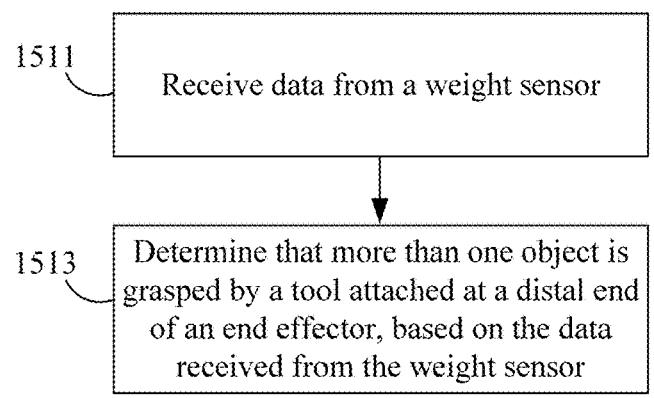
FIG. 15B shows an illustrative flow diagram for a robotic system to detect, using a weight sensor, that more than one object is grasped by an attached tool, in accordance with one embodiment of the invention.

FIG. 15B shows an illustrative flow diagram for a robotic system to detect, using a weight sensor, that more than one object is grasped by an attached tool, in accordance with one embodiment of the invention. FIG. 15B begins (step 1511) by receiving data from a weight sensor. In step 1513, the system determines that more than one object is grasped by a tool attached at a distal end of an end effector, based on the data received from the weight sensor from step 1511.

In some embodiments, the illustrative flow diagram shown in FIG. 15B is used to detect a multiple picking, after which the system rejects the pick. In other embodiments, an application may prefer to pick multiple objects simultaneously, which is faster. In such embodiments, the weight sensor detects the total weight of the objects picked, and may reject a multiple pick only if the total weight of the objects picked exceeds a predetermined threshold.

Figure 15C:
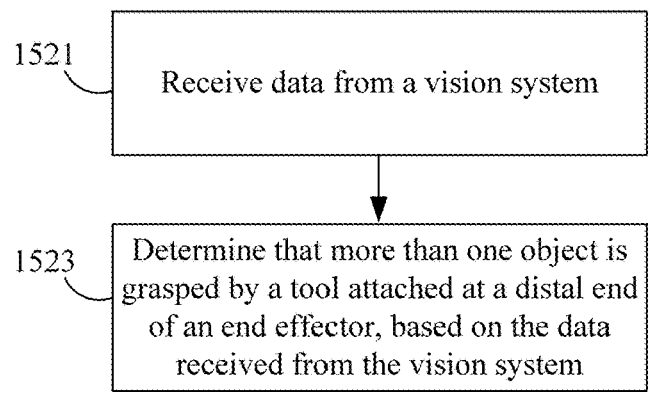
FIG. 15C shows an illustrative flow diagram for a robotic system to detect, using a vision system, that more than one object is grasped by an attached tool, in accordance with one embodiment of the invention.

FIG. 15C shows an illustrative flow diagram for a robotic system to detect, using a vision system, that more than one object is grasped by an attached tool, in accordance with one embodiment of the invention. FIG. 15C begins (step 1521) by receiving data from a vision system. In step 1523, the system determines that more than one object is grasped by a tool attached at a distal end of an end effector, based on the data received from the vision system from step 1521.

In some embodiments, the illustrative flow diagram shown in FIG. 15C is used to detect a multiple picking, after which the system rejects the pick. In other embodiments, an application may prefer to pick multiple objects simultaneously, which is faster. In such embodiments, the vision system detects the total number or approximate total volume of the objects picked, and may reject a multiple pick only if the total number or approximate total volume of the objects picked exceeds a predetermined threshold.

Replacing Detached Tool and the End Effector Tool Changer

Figure 16:
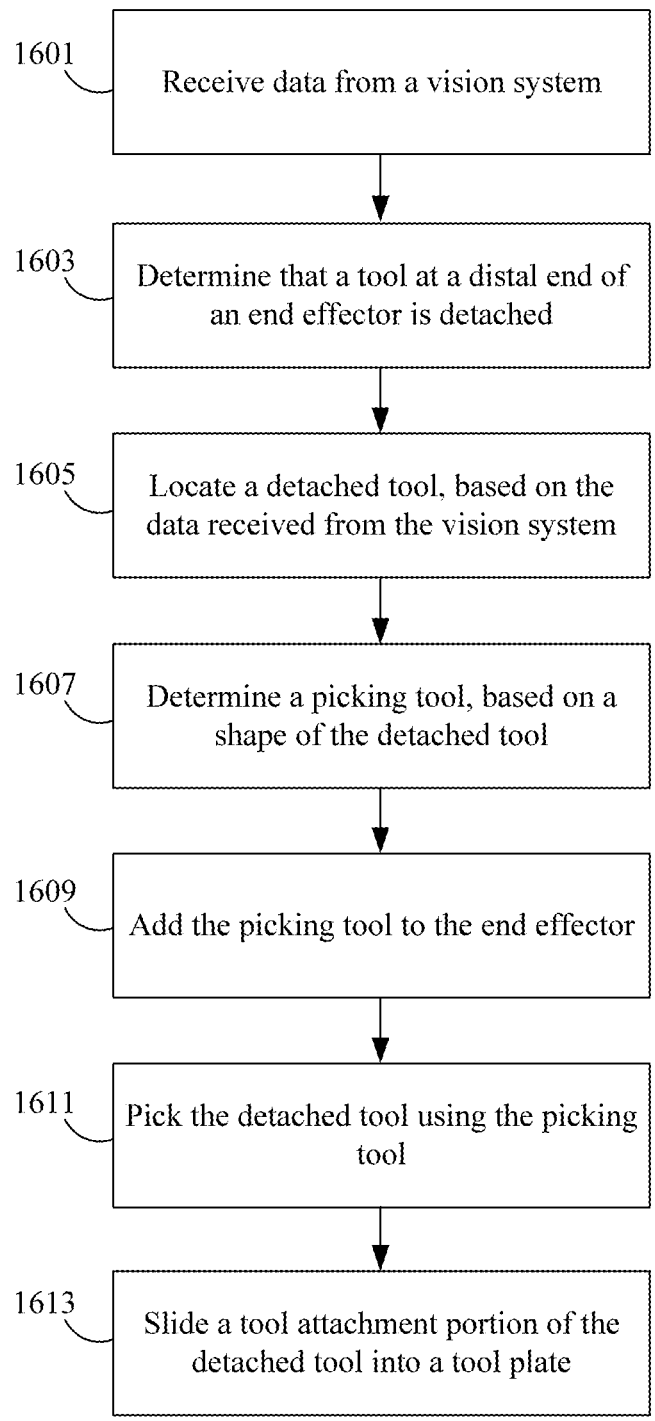
FIG. 16 shows an illustrative flow diagram for replacing a detached tool into the tool rack of a robotic system, in accordance with one embodiment of the invention.

FIG. 16 shows an illustrative flow diagram for replacing a detached tool into the tool rack of a robotic system, in accordance with one embodiment of the invention. FIG. 16 begins (step 1601) by receiving data from a vision system. In step 1603, the system determines that a tool at a distal end of an end effector is detached. In step 1605, the system locates the detached tool, based on the data received from step 1601. In step 1607, the system determines a picking tool, based on a shape of the detached tool. In step 1609, the system adds the picking tool to the end effector. In step 1611, the system picks the detached tool using the picking tool. In step 1613, the system slides a tool attachment portion of the detached tool into a tool plate, thus replacing the detached tool into the tool rack.

Improving Vision for the End Effector Tool Changer

Figure 17:
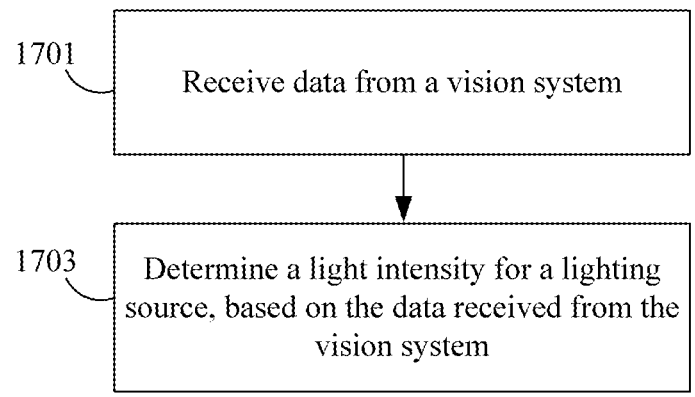
FIG. 17 shows an illustrative flow diagram for adjusting the lighting intensity to improve object or tool vision for a robotic system, in accordance with one embodiment of the invention.

FIG. 17 shows an illustrative flow diagram for adjusting the lighting intensity to improve object or tool vision for a robotic system, in accordance with one embodiment of the invention. FIG. 17 begins (step 1701) by receiving data from a vision system. In step 1703, the system determines a light intensity for a lighting source, based on the data received from step 1701.

In one embodiment, the data received from the vision system is used to determine the visibility of objects in the input components. In one embodiment, low object visibility triggers the system to increase a light intensity for a lighting source.

Selecting a Tool for the End Effector Tool Changer

Figure 18:
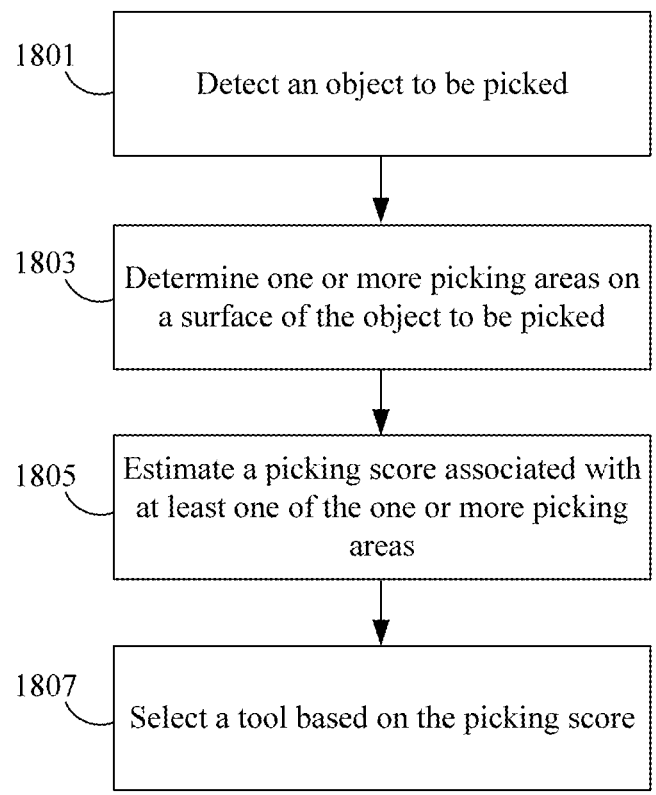
FIG. 18 shows an illustrative flow diagram for a robotic system to select a tool to pick an object, in accordance with one embodiment of the invention.

FIG. 18 shows an illustrative flow diagram for a robotic system to select a tool to pick an object, in accordance with one embodiment of the invention. FIG. 18 begins (step 1801) by detecting an object to be picked. In step 1803, the system determines one or more picking areas on a surface of the object to be picked. In step 1805, the system estimates a picking score associated with at least one of the one or more picking areas. In step 1807, the system selects a tool based on the picking score estimated in step 1805.

In another embodiment, the system may begin by detecting a plurality of objects to be picked and determining one or more picking areas on a surface of each of the plurality of objects to be picked. In another embodiment, the system may estimate a picking score associated with each determined picking area and select one picking area per detected object based on the estimated picking scores. In another embodiment, the system may prioritize picking objects having picking areas associated with the highest picking score. In yet another embodiment, the system may further compute a group picking score for a group of detected objects (e.g., objects belonging to the same type) based on the picking scores associated with a picking area of each of the objects. In another embodiment, the system may prioritize picking object groups (e.g., types) having picking areas associated with the highest group picking score.

Figure 19:
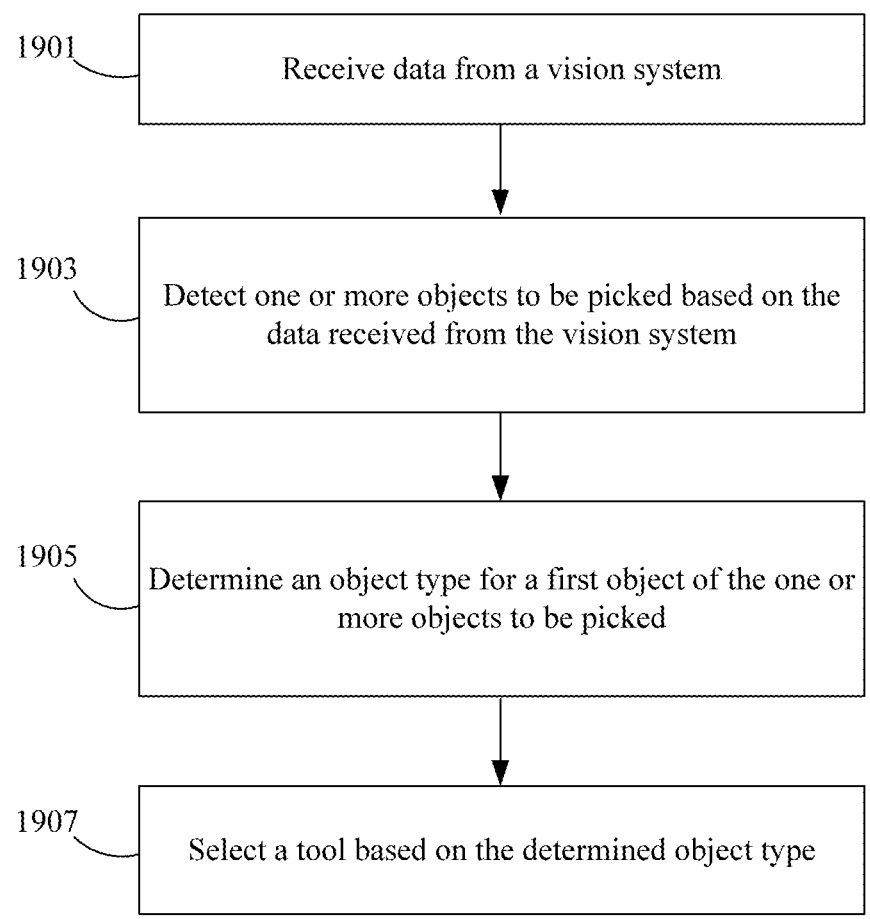
FIG. 19 shows an illustrative flow diagram for a robotic system to select a next tool based on detected object types, in accordance with one embodiment of the invention.

FIG. 19 shows an illustrative flow diagram for a robotic system to select a next tool based on detected object types, in accordance with one embodiment of the invention. FIG. 19 begins (step 1901) by receiving data from a vision system. In step 1903, the system detects one or more objects to be picked based on the data received from step 1901. In step 1905, the system determines an object type for a first object of the one or more objects to be picked. In step 1907, the system selects a tool based on the determined object type.

In one embodiment, the system may group detected objects (e.g., according to their object type) and select a tool based on the size of a detected object group.

Using Data from Vision Systems and Sensors for the End Effector Tool Changer

Figure 20:
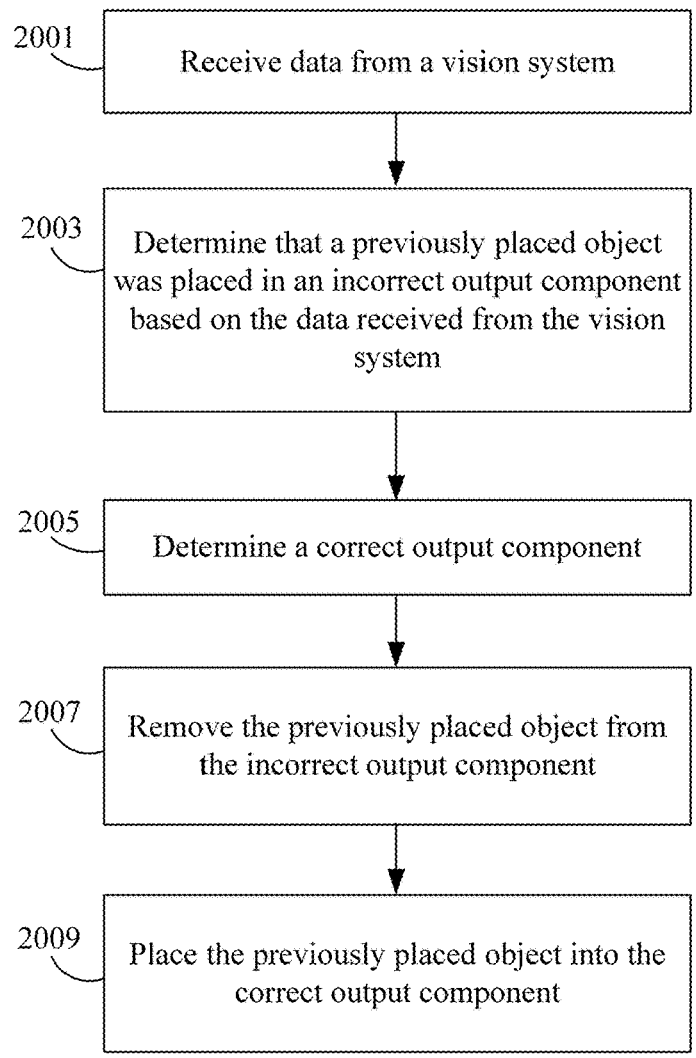
FIG. 20 shows an illustrative flow diagram for a robotic system to replace an object previously placed in an incorrect output component, in accordance with one embodiment of the invention.

FIG. 20 shows an illustrative flow diagram for a robotic system to replace an object previously placed in an incorrect output component, in accordance with one embodiment of the invention. FIG. 20 begins (step 2001) by receiving data from a vision system. In step 2003, the system determines that a previously placed object was placed in an incorrect output component based on the data received from the vision system. In step 2005, the system determines a correct output component. In step 2007, the system removes the previously placed object from the incorrect output component. In step 2009, the system places the previously placed object into the correct output component.

Figure 21:
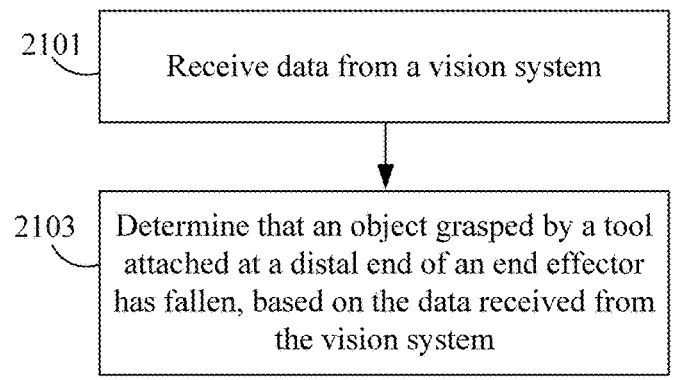
FIG. 21 shows an illustrative flow diagram for a robotic system to detect an object fall using a vision system, in accordance with one embodiment of the invention.

FIG. 21 shows an illustrative flow diagram for a robotic system to detect an object fall using a vision system, in accordance with one embodiment of the invention. FIG. 21 begins (step 2101) by receiving data from a vision system. In step 2103, the system determines that an object grasped by a tool attached at a distal end of an end effector has fallen, based on the data received from step 2101.

Figure 22:
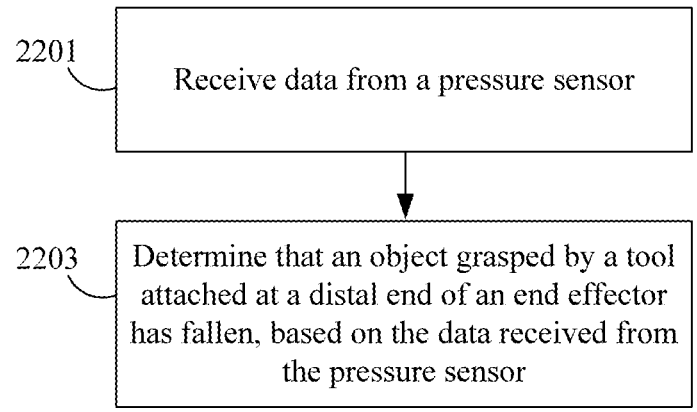
FIG. 22 shows an illustrative flow diagram for a robotic system to detect an object fall using a pressure sensor, in accordance with one embodiment of the invention.

FIG. 22 shows an illustrative flow diagram for a robotic system to detect an object fall using a pressure sensor, in accordance with one embodiment of the invention. FIG. 22 begins (step 2201) by receiving data from a pressure sensor. In step 2203, the system determines that an object grasped by a tool attached at a distal end of an end effector has fallen, based on the data received from step 2201.

In one embodiment of step 2203, the system compares the pressure reading with atmospheric pressure, where a pressure reading close to the atmospheric pressure indicates that there is no object attached to the end effector tool.

Figure 23:
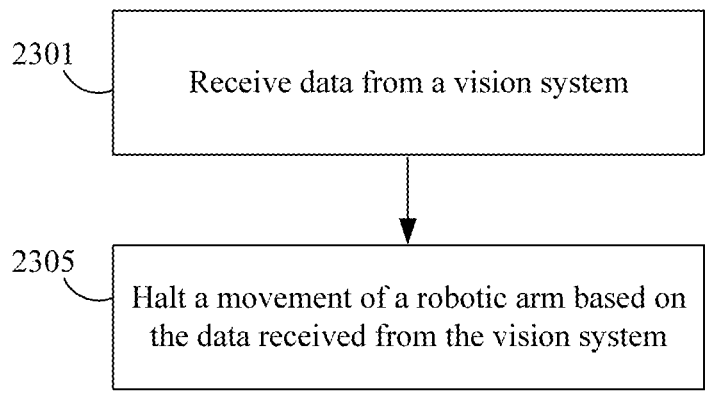
FIG. 23 shows an illustrative flow diagram for a robotic system to halt the movement of a robotic arm based on input from the vision system, in accordance with one embodiment of the invention.

FIG. 23 shows an illustrative flow diagram for a robotic system to halt the movement of a robotic arm based on input from the vision system, in accordance with one embodiment of the invention. FIG. 23 begins (step 2301) by receiving data from a vision system. In step 2305, the system halts a movement of the robotic arm based on the data received from the vision system from step 2301.

In one embodiment, arm movement is halted when an operator or an unrecognized object obstructs a trajectory of the robotic arm. In another embodiment, the vision system includes a light curtain that is used to detect obstructions to robotic arm movement. In one embodiment, the light curtain is used as a safety measure to protect operators.

Figure 24:
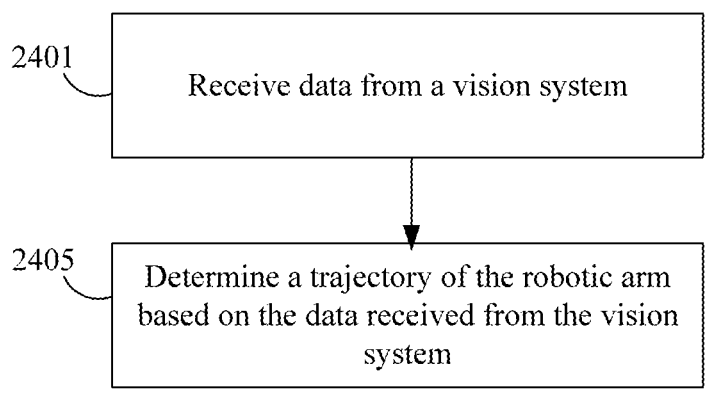
FIG. 24 shows an illustrative flow diagram for a robotic system to determine a trajectory of the robotic arm based on data received from the vision system, in accordance with one embodiment of the invention.

FIG. 24 shows an illustrative flow diagram for a robotic system to determine a trajectory of the robotic arm based on data received from the vision system, in accordance with one embodiment of the invention. FIG. 24 begins (step 2401) by receiving data from a vision system. In step 2405, the system determines a trajectory of the robotic arm based on the data received in step 2401 from the vision system.

Maintaining a Tool Status Table for the End Effector Tool Changer

FIGS. 25A, 25B, 25C, and 25D show illustrative flow diagrams for a robotic system to maintain a tool status table, in accordance with one embodiment of the invention.

Figure 25A:
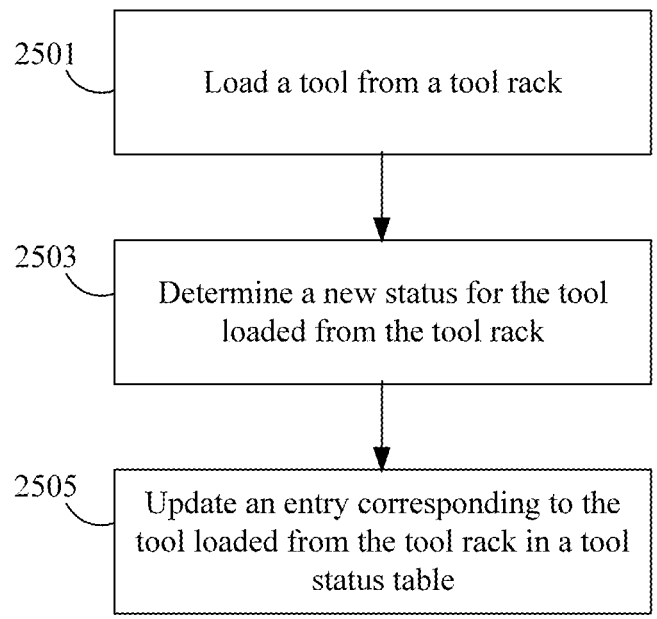
FIG. 25A shows an illustrative flow diagram for a robotic system to update a tool status table following a loading operation, in accordance with one embodiment of the invention.

FIG. 25A shows an illustrative flow diagram for a robotic system to update a tool status table following a loading operation, in accordance with one embodiment of the invention. FIG. 25A begins (step 2501) by loading a tool from a tool rack. In step 2503, the system determines a new status for the tool loaded from the tool rack. In step 2505, the system updates an entry corresponding to the tool loaded from the tool rack in a tool status table.

Figure 25B:
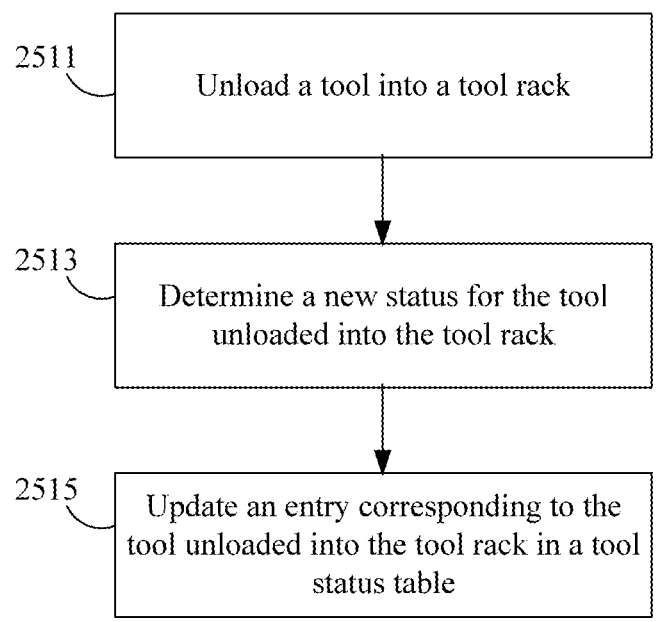
FIG. 25B shows an illustrative flow diagram for a robotic system to update a tool status table following an unloading operation, in accordance with one embodiment of the invention.

FIG. 25B shows an illustrative flow diagram for a robotic system to update a tool status table following an unloading operation, in accordance with one embodiment of the invention. FIG. 25B begins (step 2511) by unloading a tool into a tool rack. In step 2513, the system determines a new status for the tool unloaded into the tool rack. In step 2515, the system updates an entry corresponding to the tool unloaded into the tool rack in a tool status table.

Figure 25C:
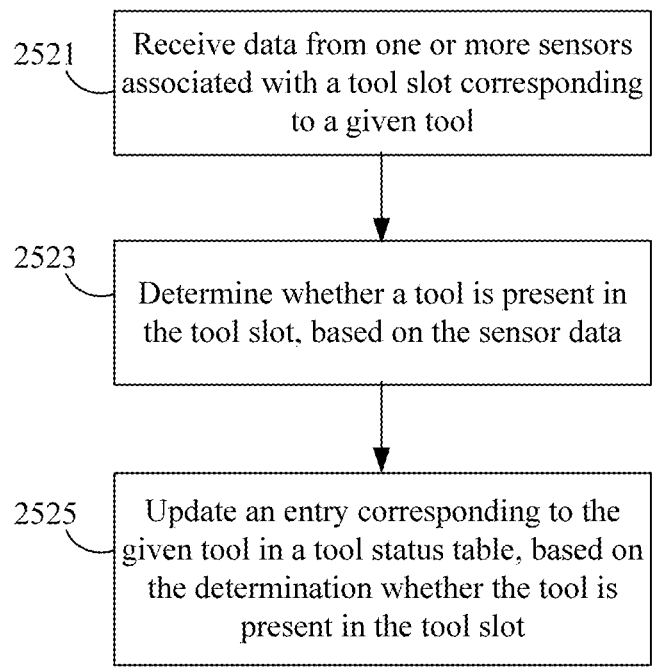
FIG. 25C shows an illustrative flow diagram for a robotic system to update a tool status table based on sensor data, in accordance with one embodiment of the invention.

FIG. 25C shows an illustrative flow diagram for a robotic system to update a tool status table based on sensor data, in accordance with one embodiment of the invention. FIG. 25C begins (step 2521) by receiving data from one or more sensors associated with a tool slot corresponding to a given tool. In step 2523, the system determines whether a tool is present in the tool slot, based on the sensor data from step 2521. In step 2525, the system updates an entry corresponding to the given tool in a tool status table, based on the determination from step 2523 whether the tool is present in the tool slot.

Figure 25D:
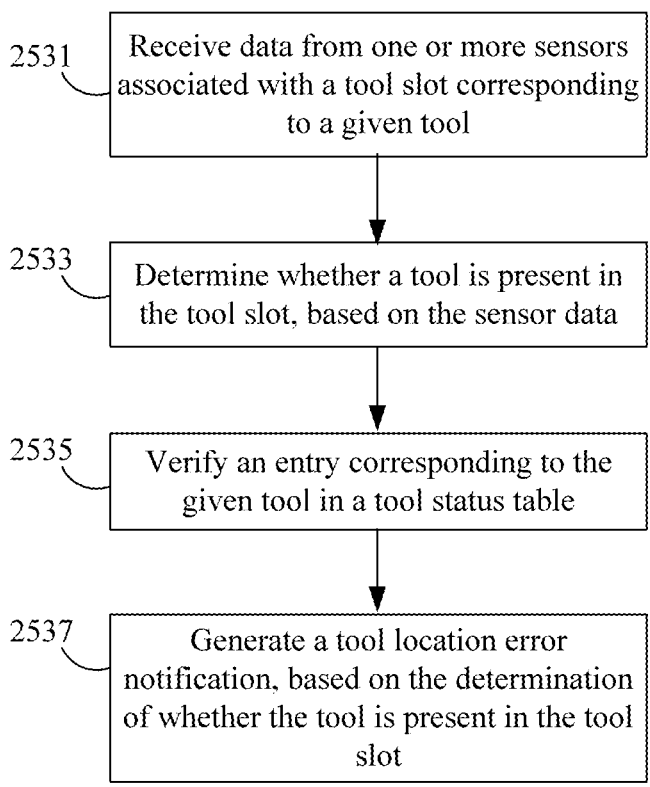
FIG. 25D shows an illustrative flow diagram for a robotic system to verify a tool status table and generate a notification based on sensor data, in accordance with one embodiment of the invention.

FIG. 25D shows an illustrative flow diagram for a robotic system to verify a tool status table and generate a notification based on sensor data, in accordance with one embodiment of the invention. FIG. 25D begins (step 2531) by receiving data from one or more sensors associated with a tool slot corresponding to a given tool. In step 2533, the system determines whether a tool is present in the tool slot, based on the sensor data from step 2531. In step 2535, the system verifies an entry corresponding to the given tool in a tool status table. In step 2537, the system generates a tool location error notification, based on the determination of whether the tool is present in the tool slot from step 2533.

In various embodiments, the system combines data from one or more of the vision system, the weight sensor, the tool wire, and the pressure sensor, to determine whether a tool is attached to the end effector, whether an object was successfully picked by the robotic arm, whether an object was released or dropped by the robotic arm, whether more than one object is grasped by an attached tool, whether a tool is damaged, and whether a tool has fallen or become detached.

Exemplary System Architecture

An exemplary embodiment of the present disclosure may include one or more servers (management computing entities), one or more networks, and one or more clients (user computing entities). For example, a server device may be used to remotely control the pick and place robotic system from a remote location, and a client device may be used to remotely monitor the operations of the robotic system. Similarly, various computing components of the robotic system may be implemented using either the server or client device architecture described herein. Each of these components, entities, devices, and systems (similar terms used herein interchangeably) may be in direct or indirect communication with, for example, one another over the same or different wired or wireless networks. Additionally, while FIGS. 26 and 27 illustrate the various system entities as separate, standalone entities, the various embodiments are not limited to this particular architecture.

Exemplary Management Computing Entity

Figure 26:
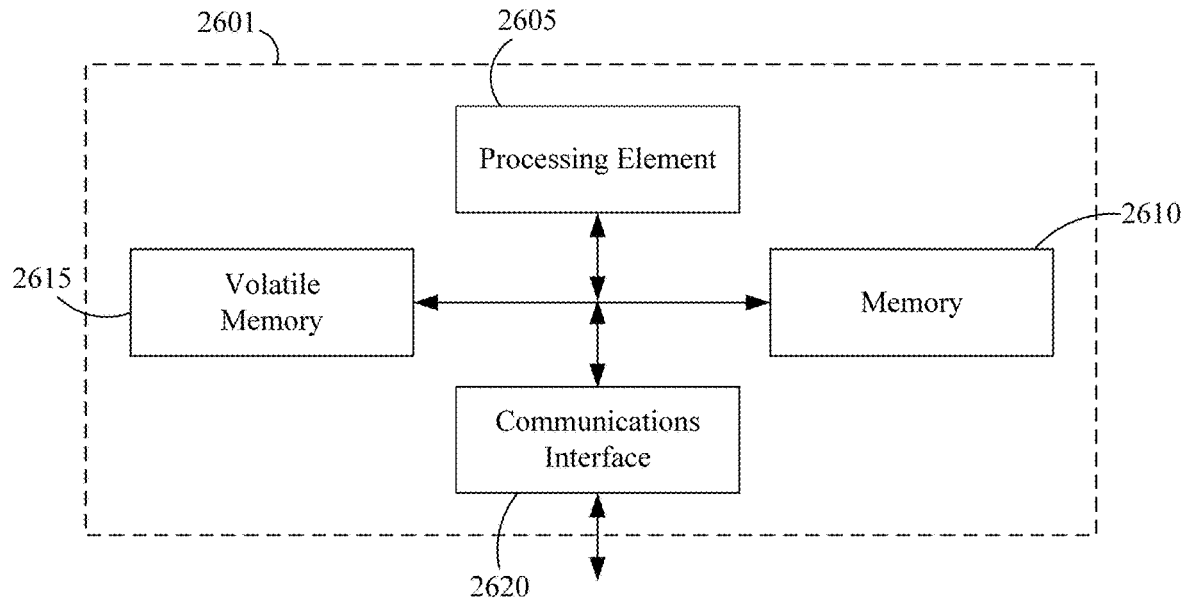
FIG. 26 provides a block diagram of a server (management computing entity) according to one embodiment of the present invention.
Figure 27:
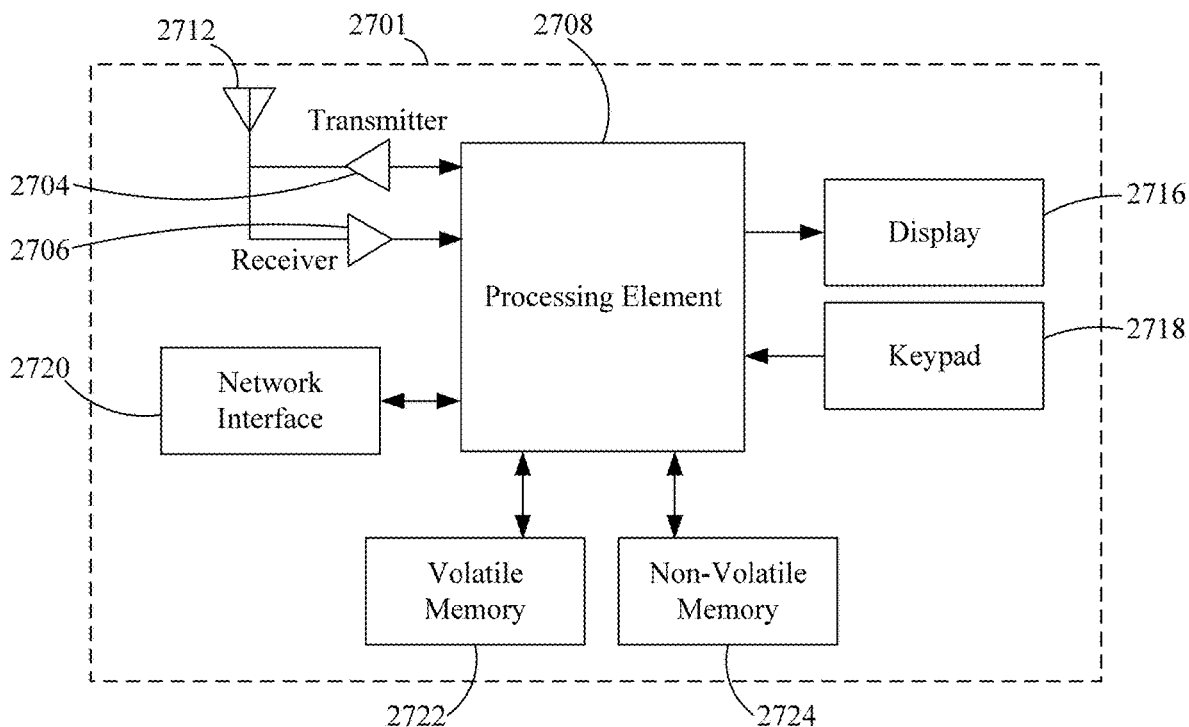
FIG. 27 provides an illustrative schematic representative of a client (user computing entity) that can be used in conjunction with embodiments of the present invention.

FIG. 26 provides a block diagram of a server (management computing entity 2601) according to one embodiment of the present disclosure. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably).

As indicated, in one embodiment, the management computing entity 2601 may also include one or more communications interfaces 2620 for communicating with various computing entities, such as by communicating data, content, and/or information (similar terms used herein interchangeably) that can be transmitted, received, operated on, processed, displayed, stored, and/or the like.

As shown in FIG. 26, in one embodiment, the management computing entity 2601 may include or be in communication with one or more processing elements 2605 (also referred to as processors, and/or processing circuitry—similar terms used herein interchangeably) that communicate with other elements within the management computing entity 2601 via a bus, for example. As will be understood, the processing element 2605 may be embodied in a number of different ways. For example, the processing element 2605 may be embodied as one or more complex programmable logic devices (CPLDs), microprocessors, multi-core processors, coprocessing entities, application-specific instruction-set processors (ASIPs), microcontrollers, and/or controllers. Further, the processing element 2605 may be embodied as one or more other processing devices or circuitry. The term circuitry may refer to an entire hardware embodiment or a combination of hardware and computer program products. Thus, the processing element 2605 may be embodied as integrated circuits, application-specific integrated circuits (ASICs), field programmable gate arrays (FPGAs), programmable logic arrays (PLAs), hardware accelerators, other circuitry, and/or the like. As will therefore be understood, the processing element 2605 may be configured for a particular use or configured to execute instructions stored in volatile or non-volatile media or otherwise accessible to the processing element 2605. As such, whether configured by hardware or computer program products, or by a combination thereof, the processing element 2605 may be capable of performing steps or operations according to embodiments of the present disclosure when configured accordingly.

In one embodiment, the management computing entity 2601 may further include or be in communication with non-volatile media (also referred to as non-volatile storage, memory, memory storage, and/or circuitry—similar terms used herein interchangeably). In one embodiment, the non-volatile storage or memory may include one or more non-volatile storage or memory media 2610, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, the management computing entity 2601 may further include or be in communication with volatile media (also referred to as volatile storage, memory, memory storage, and/or memory circuitry—similar terms used herein interchangeably). In one embodiment, the volatile storage or memory may also include one or more volatile storage or memory media 2615, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 2605. Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity 2601 with the assistance of the processing element 2605 and operating system.

As indicated, in one embodiment, the management computing entity 2601 may also include one or more communications interfaces 2620 for communicating with various computing entities, such as by communicating data, content, and/or information (similar terms used herein interchangeably) that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity 2601 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the management computing entity 2601 may include or be in communication with one or more input elements, such as a keyboard input, a mouse input, a touch screen/display input, motion input, movement input, audio input, pointing device input, joystick input, keypad input, and/or the like. The management computing entity 2601 may also include or be in communication with one or more output elements (not shown), such as audio output, video output, screen/display output, motion output, movement output, and/or the like.

As will be appreciated, one or more of the components of the management computing entity 2601 may be located remotely from other management computing entity 2601 components, such as in a distributed system. Furthermore, one or more of the components may be combined and additional components performing functions described herein may be included in the management computing entity 2601. Thus, the management computing entity 2601 can be adapted to accommodate a variety of needs and circumstances. As will be recognized, these architectures and descriptions are provided for exemplary purposes only and are not limiting to the various embodiments.

Exemplary User Computing Entity

A user may be an individual, a company, an organization, an entity, a department within an organization, a representative of an organization and/or person, and/or the like. FIG. 27 provides an illustrative schematic representative of a client (user computing entity) 2701 that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities 2701 can be operated by various parties. As shown in FIG. 27, the user computing entity 2701 can include an antenna 2712, a transmitter 2704 (e.g., radio), a receiver 2706 (e.g., radio), and a processing element 2708 (e.g., CPLDs, microprocessors, multi-core processors, coprocessing entities, ASIPs, microcontrollers, and/or controllers) that provides signals to and receives signals from the transmitter 2704 and receiver 2706, respectively.

The signals provided to and received from the transmitter 2704 and the receiver 2706, respectively, may include signaling information in accordance with air interface standards of applicable wireless systems. In this regard, the user computing entity 2701 may be capable of operating with one or more air interface standards, communication protocols, modulation types, and access types. More particularly, the user computing entity 2701 may operate in accordance with any of a number of wireless communication standards and protocols, such as those described above with regard to the management computing entity 2601. In a particular embodiment, the user computing entity 2701 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity 2701 may operate in accordance with multiple wired communication standards and protocols, such as those described above with regard to the management computing entity 2601 via a network interface 2720.

Via these communication standards and protocols, the user computing entity 2701 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 2701 can also download changes, add-ons, and updates, for instance, to its firmware, software (e.g., including executable instructions, applications, program modules), and operating system.

According to one embodiment, the user computing entity 2701 may include location determining aspects, devices, modules, functionalities, and/or similar words used herein interchangeably. For example, the user computing entity 2701 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing entity's 2701 position in connection with a variety of other systems, including cellular towers, Wi-Fi access points, and/or the like. Similarly, the user computing entity 2701 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user computing entity 2701 may also comprise a user interface (that can include a display 2716 coupled to a processing element 2708) and/or a user input interface (coupled to a processing element 2708). For example, the user interface may be a user application, browser, user interface, and/or similar words used herein interchangeably executing on and/or accessible via the user computing entity 2701 to interact with and/or cause display of information from the management computing entity 2601, as described herein. The user input interface can comprise any of a number of devices or interfaces allowing the user computing entity 2701 to receive data, such as a keypad 2718 (hard or soft), a touch display, voice/speech or motion interfaces, or other input device. In embodiments including a keypad 2718, the keypad 2718 can include (or cause display of) the conventional numeric (0-9) and related keys (#, *), and other keys used for operating the user computing entity 2701 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 2701 can also include volatile storage or memory 2722 and/or non-volatile storage or memory 2724, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 2701. As indicated, this may include a user application that is resident on the entity or accessible through a browser or other user interface for communicating with the management computing entity 2601 and/or various other computing entities.

In another embodiment, the user computing entity 2701 may include one or more components or functionality that are the same or similar to those of the management computing entity 2601, as described in greater detail above. As will be recognized, these architectures and descriptions are provided for exemplary purposes only and are not limiting to the various embodiments.

Figure 28:
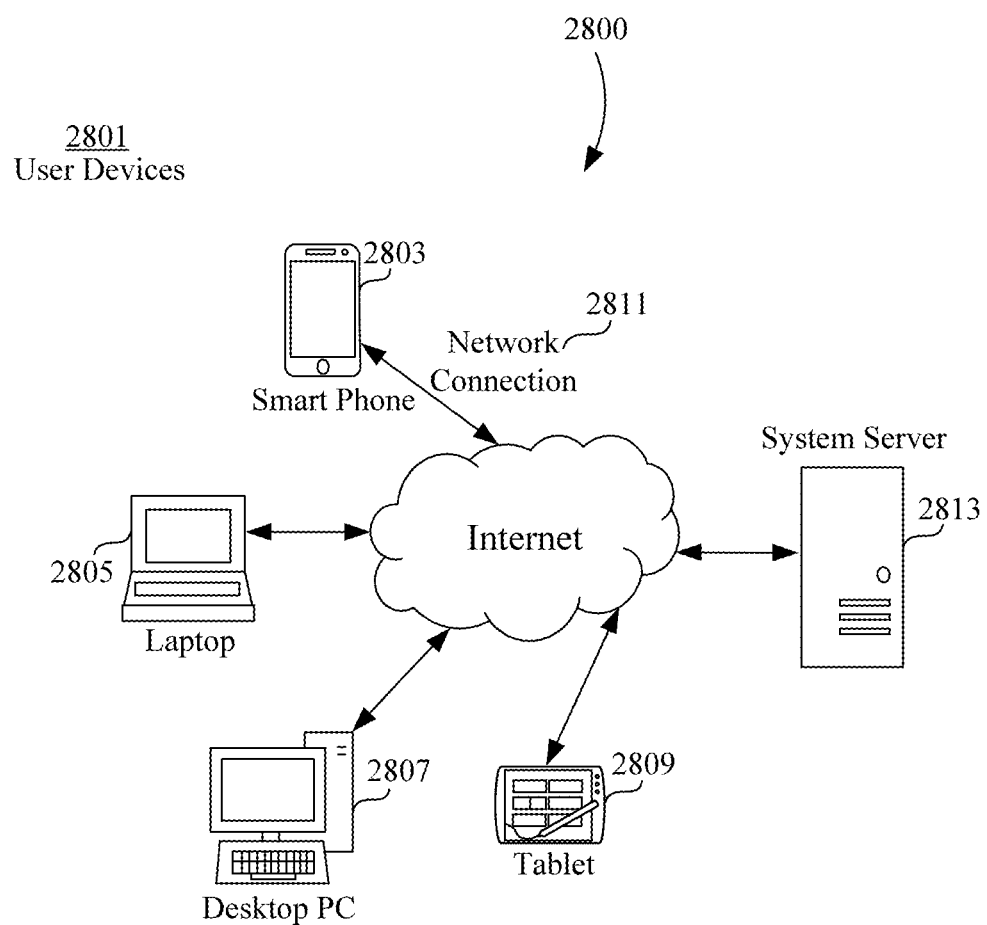
FIG. 28 shows an illustrative system architecture diagram for implementing one embodiment of the present invention in a client-server environment.

The present invention may be implemented in a client server environment. FIG. 28 shows an illustrative system architecture 2800 for implementing one embodiment of the present invention in a client server environment. User devices 2801 on the client side may include smart phones 2803, laptops 2805, desktop PCs 2807, tablets 2809, or other devices. Such user devices 2801 access the service of the system server 2813 through some network connection 2811, such as the Internet.

Conclusions

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap to practice the methods of the present invention.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

What is claimed is:

1. An end effector tool changer device for a robotic system, comprising:
   a robotic arm attachment portion, comprising a first magnetic part and a first engagement part; and
   a tool attachment portion, comprising a second magnetic part and a second engagement part;
   wherein the first engagement part is configured to engage with the second engagement part;
   wherein the first engagement part and the second engagement part are selected from the group consisting of a pin and a socket;
   wherein the first magnetic part spatially and magnetically corresponds to the second magnetic part;
   wherein the first magnetic part is an upper magnet slipped into a first cavity of the first engagement part;
   wherein the second magnetic part is a lower magnet slipped into a second cavity of the second engagement part; and
   wherein the first magnetic part and the second magnetic part are configured to be separated by a plurality of housing shells.

2. The end effector tool changer device of claim 1, wherein the first engagement part and the second engagement part are keyed in cross-sectional shape.

3. The end effector tool changer device of claim 1, wherein the first engagement part and the second engagement part are non-circular in cross-sectional shape.

4. The end effector tool changer device of claim 3, wherein the first engagement part and the second engagement part are hexagonal in cross-sectional shape.

5. The end effector tool changer device of claim 1, wherein the tool attachment portion further comprises a plurality of rack grooves.

6. The end effector tool changer device of claim 5, wherein one or more of the plurality of rack grooves are beveled.

7. The end effector tool changer device of claim 5, wherein the plurality of rack grooves is a pair of rack grooves.

8. The end effector tool changer device of claim 5, further comprising:
   a tool plate comprising a slot, wherein one or more dimensions of the slot correspond to the plurality of rack grooves.

9. The end effector tool changer device of claim 8, wherein the slot is tapered.

10. The end effector tool changer device of claim 1, wherein the robotic arm attachment portion further comprises a robotic arm attachment portion through-hole and the tool attachment portion further comprises a tool attachment portion through-hole.

11. The end effector tool changer device of claim 10, wherein the robotic arm attachment portion through-hole and the tool attachment portion through-hole are configured to carry electrical power or electrical signals.

12. The end effector tool changer device of claim 10, wherein the robotic arm attachment portion through-hole and the tool attachment portion through-hole comprise a plurality of air channels, wherein each of the plurality of air channels is configured to maintain a vacuum or to carry compressed air.

13. The end effector tool changer device of claim 10, wherein the robotic arm attachment portion through-hole is adjacent to a leakage prevention device.

14. The end effector tool changer device of claim 1, wherein the first engagement part comprises a pin with a tapered tip.

15. The end effector tool changer device of claim 1, wherein the second engagement part comprises a beveled socket.

16. The end effector tool changer device of claim 1, wherein the robotic system is a robotic system configured for object manipulation.

* * * * *